US011343772B2

(12) United States Patent
Ljung et al.

(10) Patent No.: US 11,343,772 B2
(45) Date of Patent: May 24, 2022

(54) TWO-PART WAKE-UP SIGNAL

(71) Applicant: Sony Corporation, Tokyo (JP)

(72) Inventors: Rickard Ljung, Helsingborg (SE);
Anders Berggren, Lund (SE); Basuki Priyanto, Lund (SE); Nafiseh Mazloum, Lund (SE)

(73) Assignee: Sony Group Corporation, Tokyo (JP)

( * ) Notice: Subject to any disclaimer, the term of this patent is extended or adjusted under 35 U.S.C. 154(b) by 57 days.

(21) Appl. No.: 16/760,943

(22) PCT Filed: Oct. 31, 2018

(86) PCT No.: PCT/EP2018/079827
§ 371 (c)(1),
(2) Date: May 1, 2020

(87) PCT Pub. No.: WO2019/086516
PCT Pub. Date: May 9, 2019

(65) Prior Publication Data
US 2020/0260382 A1 Aug. 13, 2020

(30) Foreign Application Priority Data
Nov. 3, 2017 (SE) .................................. 1730301-7

(51) Int. Cl.
*G08C 17/00* (2006.01)
*H04W 52/02* (2009.01)
*H04L 5/00* (2006.01)

(52) U.S. Cl.
CPC ....... *H04W 52/0229* (2013.01); *H04L 5/0048* (2013.01)

(58) Field of Classification Search
CPC .......................... H04W 52/0229; H04L 5/0048
USPC .......................................................... 370/311
See application file for complete search history.

(56) References Cited

U.S. PATENT DOCUMENTS

| 2006/0133408 | A1  | 6/2006  | Nogueira-Nine et al. |
| 2012/0069893 | A1  | 3/2012  | Shirakata et al. |
| 2014/0050133 | A1* | 2/2014  | Jafarian ............. H04W 74/085 370/311 |
| 2014/0211678 | A1  | 7/2014  | Jafarian et al. |
| 2016/0128128 | A1* | 5/2016  | Ang .................. H04W 52/0235 370/311 |
| 2016/0278013 | A1  | 9/2016  | Shellhammer et al. |
| 2017/0201943 | A1  | 7/2017  | Hsu et al. |
| 2018/0019902 | A1* | 1/2018  | Suh ..................... H04L 27/2602 |
| 2018/0132176 | A1* | 5/2018  | Abraham .......... H04W 52/0212 |
| 2018/0288706 | A1* | 10/2018 | Fang ................... H04L 27/2603 |
| 2020/0029302 | A1* | 1/2020  | Cox ................... H04W 56/0015 |
| 2021/0153120 | A1* | 5/2021  | Atungsiri ............ H04L 27/2613 |

OTHER PUBLICATIONS

Intel Corporation (R2-1710641, WUS consideration for efeMTC, Oct. 9-13, 2017) (Year: 2017).*

(Continued)

*Primary Examiner* — Maharishi V Khirodhar
(74) *Attorney, Agent, or Firm* — Tucker Ellis LLP

(57) ABSTRACT

A wake-up signal includes a first part and a second part. The first part is related to a cell of a base station transmitting the wake-up signal and includes a synchronization signal for synchronizing a terminal with the base station. The second part is related to one or more terminals.

15 Claims, 12 Drawing Sheets

(56) References Cited

OTHER PUBLICATIONS

Nokia (R1-1717222, "Wake up signal for efeMTC", Oct. 9-13, 2017) (Year: 2017).*
Intel Corporation (R1-1717344, "Configuration of wake up signal for feNB-IOT", Oct. 9-13, 2017 (Year: 2017).*
OPPO, R1-1718064 "on wake up signal design" (Year: 2017).*
Swedish Search Report from corresponding Swedish Application No. 1730301-7, dated Jul. 4, 2018, 2 pages.
Ericsson: "Wake-up signal for NB-IoT & eMTC"; 3GPP TSG-RAN WG2 #99is, R2-1710749, dated Oct. 9-13, 2017, 8 pages, Prague, Czech Republic.
Qualcomm Inc.: "Wake-up signal configurations and procedures"; 3GPP TSG RAN WG1, Meeting 90bis; R1-1718141; dated Oct. 9-13, 2017, 7 pages, Prague, Czech Republic.
International Search Report and Written Opinion for corresponding International Application No. PCT/EP2018/079827, dated Jan. 24, 2019, 14 pages.

* cited by examiner

TWO-PART WAKE-UP SIGNAL

CROSS-REFERENCE TO RELATED APPLICATIONS

This application is a National Phase Application of International Application No. PCT/EP2018/079827, filed Oct. 31, 2018, which claims priority to Swedish Patent Application No. SE 173031-7, filed on Nov. 3, 2017.

TECHNICAL FIELD

Various examples of the invention generally relate to communicating wake-up signals. Various examples of the invention specifically relate to communicating wake-up signals having a first part and a second part.

BACKGROUND

Wireless communication is an integral part of modern life. Reducing energy consumption of wireless communication is an important task to enable various applications such as Internet of Things (IOT) or Machine Type Communication (MTC).

One approach to reduce the energy consumption of wireless communication is to use wake-up techniques. Here, a terminal/user equipment (UE) may include two receivers, i.e., one main receiver and a low-power receiver. The low-power receiver may implement a comparably simple architecture and, therefore, may consume less power during operation than the main receiver. The low-power receiver can be activated when the main receiver has transitioned into an inactive state. Then, the low-power receiver can receive the wake-up signal (WUS) and, in response to receiving the WUS, the main receiver can transition again to the active state. Payload data may be transmitted and/or received (communicated) by the main receiver.

Example implementations are described by Third Generation Partnership Project (3GPP) TSG RAN Meeting #74 contribution RP-162286 "Motivation for New WI on Even further enhanced MTC for LTE"; 3GPP TSG RAN Meeting #74 contribution RP-162126 "Enhancements for Rel-15 eMTC/NB-IoT"; and 3GPP TSG RAN WG1 #88 R1-1703139 "Wake Up Radio for NR". See 3GPP R2-1708285.

However, such reference implementations are subject to certain restrictions and drawbacks. For example, it is possible that UE mobility occurs while operating one or more receivers of the UE in the inactive state. Once the respective receiver is transitioned into the active state, it is then required to identify a cell identity of the respective cell; this is typically achieved by receiving broadcasted information blocks. Based on reference signals, it is also possible to perform channel sensing in order to verify that the signal quality provided by the serving base station is sufficient. Furthermore, in some examples, the time duration for which one or more receivers of the UE are in the inactive state can be significant. Then, it is possible that during this time duration the UE and the serving base station lose synchronization. In such a scenario, it would be required to acquire synchronization in time domain and/or frequency domain by receiving broadcasted synchronization signals.

Channel sensing, identification of the cell identity, and synchronization can require significant energy. This may be a problem in connection with IOT or MTC UEs which are typically battery-powered and, therefore, require low energy consumption. Additionally, such tasks may require significant time, thereby increasing the latency of any subsequent data communication.

SUMMARY

Therefore, a need exists for advanced techniques of communicating WUSs. In particular, a need exists for techniques of implementing energy-efficient wake-up techniques. A need exists for techniques of implementing low-latency wake-up techniques.

This need is met by the features of the independent claims. The features of the dependent claims define embodiments.

A method of operating a terminal comprises receiving a first part of a wake-up signal from a base station. The method optionally comprises receiving a second part of the wake-up signal from the base station. The first part is related to a cell associated with the base station. The second part is related to the terminal.

A method of operating a terminal comprises receiving a synchronization signal and/or a reference signal from a base station. The method comprises synchronizing the terminal with the base station based on the synchronization signal. The method optionally comprises receiving a wake-up signal form the base station, based on said synchronizing. Channel sensing can be performed based on the reference signal.

A computer program product or computer program comprises program code that may be executed by control circuitry. Executing the program code causes the at least one processor to perform a method. The method comprises receiving a first part of a wake-up signal from a base station. The method optionally comprises receiving a second part of the wake-up signal from the base station. The first part is related to a cell associated with the base station. The second part is related to the terminal.

A terminal comprises control circuitry configured to receive a first part of a wake-up signal from a base station and configured to optionally receive a second part of the wake-up signal from the base station. The first part is related to a cell associated with the base station. The second part is related to the terminal.

A method of operating a base station of a network comprises transmitting a first part of a wake-up signal and optionally transmitting a second part of the wake-up signal. The first part is related to a cell associated with the base station and the second part is related to a terminal.

A computer program product or computer program comprises program code that may be executed by control circuitry. Executing the program code causes the at least one processor to perform a method. The method comprises transmitting a first part of a wake-up signal and optionally transmitting a second part of the wake-up signal. The first part is related to a cell associated with the base station and the second part is related to a terminal.

A base station of a network comprises comprising control circuitry. The control circuitry is configured to transmit a first part of a wake-up signal and to optionally transmit a second part of the wake-up signal. The first part is related to a cell associated with the base station and the second part is related to a terminal.

By such techniques, it is possible to implement energy-efficient and low-latency wake-up techniques.

DETAILED DESCRIPTION OF EMBODIMENTS

Figure 1:
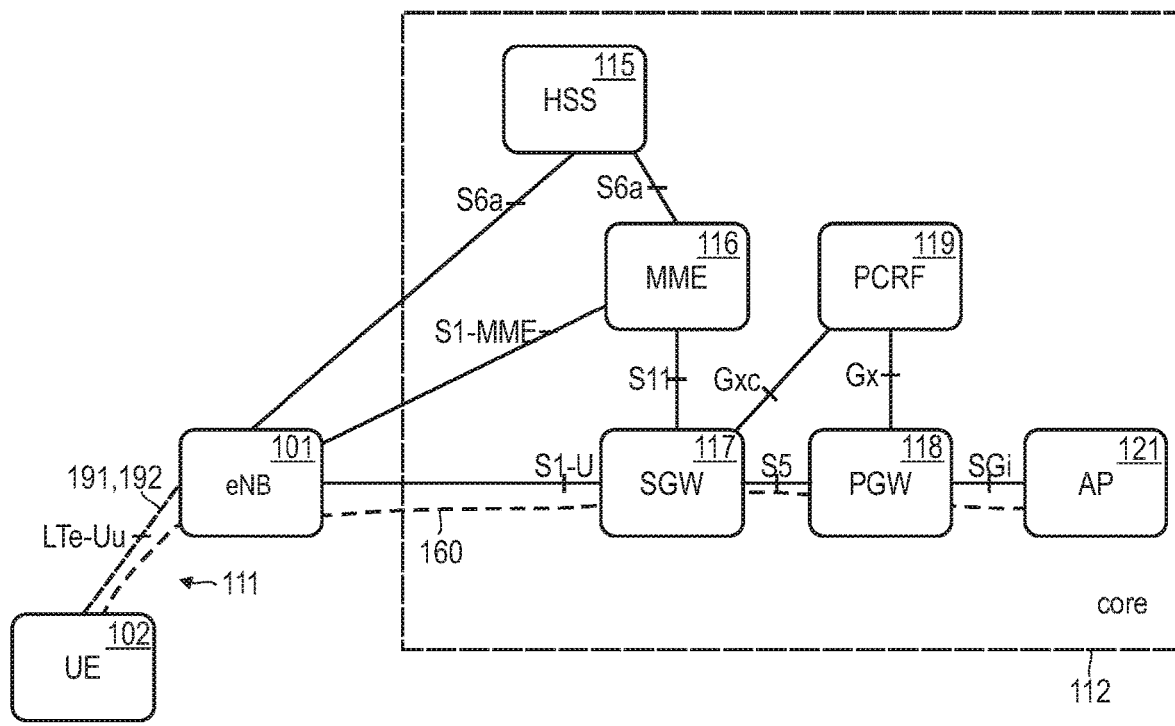
FIG. 1 schematically illustrates a network including a core network and a radio access network according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, wake-up techniques are described. The wake-up techniques enable a UE to transition a main receiver into a low-power state, e.g., for power-saving purposes. In some examples, the low-power state of the main receiver may be an inactive state.

The inactive state can be characterized by a significantly reduced power consumption if compared to an active state of the main receiver. For example, the main receiver may be unfit to receive any data in the inactive state such that some or all components may be shut down. Wake-up of the main receiver from the inactive state is then triggered by a WUS.

The WUS may be received by a dedicated low-power receiver of the UE. The WUS may have a comparably simple modulation, e.g., On-Off Keying or the like, which facilitates a simple time-domain operation by the low-power receiver. For example, non-coherent decoding may be possible. For non-coherent decoding, knowledge of a reference phase is not required for signal detection. In other examples, the WUS may be received by the main receiver in the low-power state. Here, it may not be required to provision a dedicated low-power receiver.

The low-power receiver and main receiver may be implemented within the same hardware component(s) or may be implemented by at least one different hardware component.

The WUS may help to avoid blind decoding of a control channel on which paging signals and/or paging messages are communicated. Since typically such blind decoding is comparably energy inefficient, thereby, power consumption can be reduced by using WUSs. This is explained in greater detail hereinafter: For example, in the 3GPP scenario, during paging occasions, the UE is expected to blind decode the control channels MPDCCH (for Machine Type Communication) or PDCCH (for LTE) or NPDCCH (for NB-IOT) for P-RNTI as UE identity. If presence of a paging indicator including the P-RNTI is detected, the UE continues to decode a subsequent data shared channel (PDSCH) for a paging message. However, the paging message on PDSCH may be indicative of paging of other UEs, and not for the given UE. In this case, the given UE needs to go back to sleep until the next paging occasion. Moreover, in applications where the paging rate is very low, the cost of UE idle listening can become very high relatively. Under this condition, the UE needs to monitor the control channel without receiving any paging indication. In Machine Type Communications (MTC), it could be even worse as the respective MPDCCH control channel is transmitted with the highest number of repetitions which reflect the maximum extended coverage used in that cell. By provisioning at least a part of the WUS in a UE-related manner, the UE may be aware of the potential of subsequent paging without a need of blindly decoding paging signals. This reduces power consumption.

Communication of the WUS may be time-aligned with a discontinuous reception cycle of the UE. General techniques of discontinuous reception are, for example, described in 3GPP TS 36.331, Version 14.0.0.

Various techniques are based on the finding that the need of acquiring synchronization in time domain and/or frequency domain, according to reference implementations, before being able to receive a WUS can increase energy consumption and latency. Similarly, various techniques are based on the finding that the need of receiving a cell identity and/or reference signals for channel sensing, according to reference implementations, before being able to receive a WUS can increase energy consumption and latency.

According to various examples, preamble-based WUSs are used. This helps to support mobility operation including channel sensing and paging mechanisms.

According to various examples, a WUS includes a first part and a second part. For example, the first part may implement a preamble. It is possible that the first part is related to the cell of the base station (BS) which transmits the WUS. For example, the first part may be cell-specific. Differently, the second part may be related to the one or more UEs to which the WUS is directed. For example, the WUS could be directed to one UE or a group of UEs. As such, the second part may be UE-specific. The second part of the WUS may include a respective identifier indicative of the identity of the one or more UEs.

The first part and the second part may be transmitted in direct succession, i.e., without any further symbols in-between, etc. There may be a time gap between the first part and the second part, e.g., a guard interval. For example, the time gap between the first part and the second part may not be larger than 5 ms, optionally not larger than 0.5 ms. The first part and the second part may be arranged at a predefined time-frequency offset. Thus, the first part and the second part may be repeatedly transmitted at the same repetition rate; but it is also possible that the first part and the second part may be repeatedly transmitted at different repetition rates. For example, the repetition rates may be aligned with respect to a periodicity of a discontinuous reception cycle, such that the first part and the second part are being transmitted within each discontinuous reception interval. The first part and the second part may reside at the same frequency or at different frequencies.

By implementing such a two-part WUS, it is possible to include certain functionality in the first part of the WUS that goes beyond mere wake-up signaling implemented by the second part. For example, it would be possible that the first part includes a cell identity of the cell associated with the transmitting BS, and/or a reference signal for channel sensing; and/or a synchronization signal for synchronization between the UE and the BS. Hence, in other words, it is possible that the first part consists of the reference signal; or the synchronization signal; or the cell identity. To this end, the first part WUS may be simply referred to as synchronization signal.

Channel sensing may help to identify a power level of communication on the respective channel. As such, channel sensing may facilitate determining Reference Signal Received Power (RSRP) and/or Reference Signal Received Quality (RSRQ).

Thereby, the UE may rely on the first part of the WUS for identifying the particular cell on which it is camping on, performing channel sensing, and/or synchronizing with the BS. This renders it unnecessary to receive any broadcasted information blocks and/or broadcasted reference signals and/or broadcasted synchronization signals. Rather, the UE may rely on the first part of the WUS exclusively. Thereby, energy consumption and latency is reduced. For example, in the 3GPP LTE framework, it may not be required to receive broadcasted 3GPP primary synchronization signals (PSSs) and secondary synchronization signals (SSSs); see 3GPP TS 36.211, Version 14.0.0 (2016-09), section 6.11.

A WUS can be transmitted at predetermined WUS transmission occasions. These occasions may be defined in a pre-determined pattern, e.g. with a certain repetition interval. When a WUS occasion occurs, there could be two WUS transmission schemes: One transmission scheme may be referred to as "WUS with DTX", in which a WUS is only transmitted in case one or more UE:s are to be woken up with the signal. The other transmission scheme may be referred to as "WUS without DTX", in which at least some part of a WUS has to be transmitted at the occasion, even when no UE is supposed to be woken up. Specifically a WUS without DTX may use a preamble, since it allows a UE listening to the WUS to perform channel sensing or cell verification/identification at any expected WUS transmission occasion even if no UE is being woken up. This helps to maintain synchronization and control UE mobility. FIG. 1 illustrates aspects with respect to a network 100. Such a network 100 may be employed in the various examples disclosed herein, e.g., for communicating WUSs. FIG. 1 illustrates aspects with respect to the architecture of the network 100. The network 100 according to the example of FIG. 1 implements the 3GPP LTE architecture.

The illustration of the network 100 in FIG. 1 in the 3GPP LTE framework is for exemplary purposes only. Similar techniques can be readily applied to various kinds of 3GPP-specified architectures. For example, the techniques described herein may be applied to the 3GPP eNB-IoT or MTC systems or 3GPP New Radio (NR) systems, sometimes also referred to as 5G. See, for example, 3GPP RP-161321 and RP-161324. Furthermore, respective techniques may be readily applied to various kinds of non-3GPP-specified networks, such as Bluetooth, satellite networks, IEEE 802.11x Wi-Fi technology, etc.

The network 100 includes a radio access network (RAN) formed by a BS 101. A UE 102 is connected to the network via the BS 101. A wireless link 111 is defined between the UE 102 and the BS 101.

The network 100 includes a core network (CN) 112. The CN 112—the evolved packet core (EPC) in 3GPP LTE—is in communication with the RAN. The CN 112 includes a control layer and a data layer. The control layer includes control nodes such as the home subscriber server (HSS) 115, the mobile management entity (MME) 116, and the policy and charging rules function (PCRF) 119. The data layer includes gateway nodes such as the serving gateway (SGW) 117 and the packet data network gateway (PGW) 118.

For example, the MME 116 controls CN-initiated paging of the UEs 102 if the respective UE 102 operates in RRC idle mode. The MME 116 may keep track of the timing of a discontinuous reception (DRX) cycle of the UE 102. For example, the MME 116 may be part of establishing a data connection 160. The MME 116 may trigger transmission of WUSs and/or of paging signals by the BS 101.

The data connection 160 is established if the respective UE 102 operates in RRC connected mode. To keep track of the current state of the UEs 102, the MME 116 sets the UE 102 to ECM connected or ECM idle. During ECM connected, a non-access stratum (NAS) connection is maintained between the UE 102 and the MME 116. The NAS connection implements an example of a mobility control connection.

The general functioning and purpose of the network nodes 115-119, 121 of the CN 112 is well known in the art such that a detailed description is not required in this context.

Figure 2:
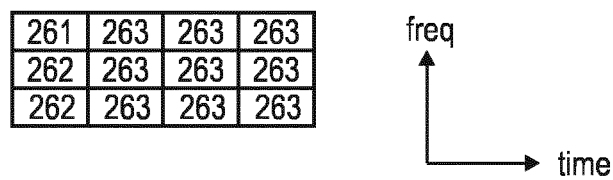
FIG. 2 schematically illustrates resource allocation for multiple channels according to various examples.

The data connection 160 is established between the UE 102 via the RAN and the data layer of the CN 112 and towards an access point 121. For example, a connection with the Internet or another packet data network can be established via the access point 121. To establish the data connection 160, it is possible that the respective UE 102 performs a random access (RACH) procedure, e.g., in response to reception of network paging and, optionally, a preceding WUS. A server of the packet data network or the Internet may host a service for which payload data is communicated via the data connection 160. The data connection 160 may include one or more bearers such as a dedicated bearer or a default bearer. The data connection 160 may be defined on the RRC layer, e.g., generally Layer 3 of the OSI model of Layer 2. Establishing of the data connection 160 may thus include OSI Network layer control signaling. By means of the data connection 160, time-frequency resources may be allocated on payload channels such as the Physical UL Shared Channel (PUSCH) and/or the Physical DL Shared Channel (PDSCH) to facilitate transmission of payload data. A control channel such as the Physical DL Control Channel (PDCCH) can facilitate transmission of control data. Also a Physical UL Control Channel (PUCCH) can be implemented. FIG. 2 illustrates time-frequency resources allocated to different communication channels 261-263 in a time-frequency grid.

FIG. 2 illustrates aspects with respect to channels 261-263 implemented on the wireless link 111. The wireless link 111 implements a plurality of communication channels 261-263. Transmission frames—e.g., implemented by radio frames, each including one or more subframes—of the channels 261-263 occupy a certain time duration. Each channel 261-263 includes a plurality of resources which are defined in time domain and frequency domain. For example, the resources may be defined with respect to symbols encoded and modulated according to Orthogonal Frequency Division Multiplexing (OFDM). The resources may be defined in a time-frequency resource grid.

For example, a first channel 261 may carry WUSs. The WUSs enable the network 100—e.g., the MME 116—to page the UE 102 when the UE 102 is in a respective idle mode. The WUSs may thus be communicated in dedicated resources of the channel 261.

A second channel 262 may carry paging signals or paging indicators which enable the network 100—e.g., the MME 116—to page the UE 102 when the UE 102 is in a respective idle mode. The paging signals or paging indicators may thus be communicated in dedicated resources of the channel 262. Typically, the paging indicators are communicated on PDCCH As will be appreciated from the above, the WUSs and the paging signals may be different from each other in that they are transmitted on different channels 261, 262. Different resources may be allocated to the different channels 261-263. For example, in many scenarios the WUS and the paging signals are transmitted in two different time instances.

Further, a third channel 263 is associated with a payload messages carrying higher-layer user-plane data packets associated with a given service implemented by the UE 102 and the BS 101 (payload channel 263). User-data messages may be transmitted via the payload channel 263. According to the E-UTRAN RAT, the payload channel 263 may be the PDSCH or the PUSCH. Alternatively, control messages may be transmitted via the channel 263, e.g., a paging message.

Figure 3:
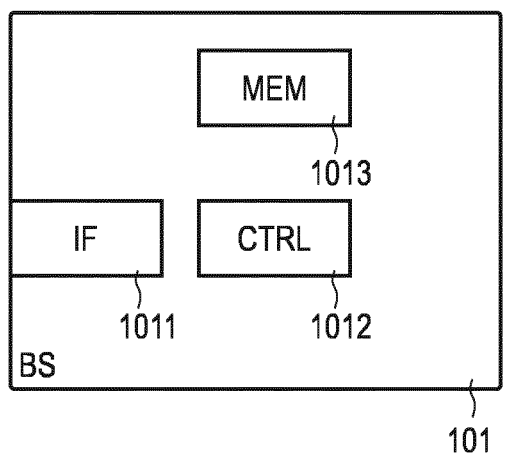
FIG. 3 schematically illustrates a base station of the radio access network according to various examples.

FIG. 3 schematically illustrates the BS 101. The BS 101 includes an interface 1011. For example, the interface 1011 may include an analog front end and a digital front end. The BS 101 further includes control circuitry 1012, e.g., implemented by means of one or more processors and software. For example, program code to be executed by the control circuitry 1012 may be stored in a non-volatile memory 1013. In the various examples disclosed herein, various functionality may be implemented by the control circuitry 1012, e.g.: transmitting WUSs; generating WUS including a first part and a second part; etc.

Figure 4:
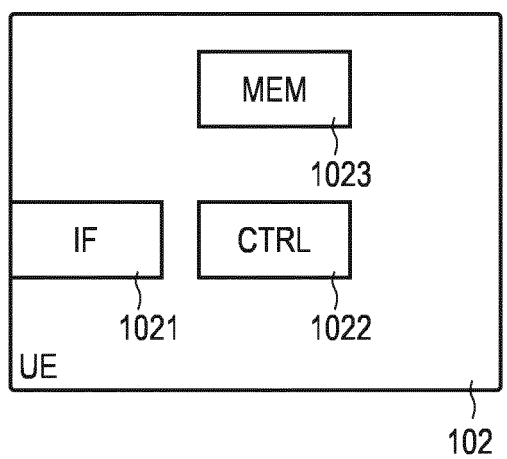
FIG. 4 schematically illustrates a UE connectable to the network via the radio access network according to various examples.

FIG. 4 schematically illustrates the UE 102. The UE 102 includes an interface 1021. For example, the interface 1021 may include an analog front end and a digital front end. In some examples, the interface 1021 may include a main receiver and a low-power receiver. Each one of the main receiver and the low-power receiver may include an analog front end and a digital front end, respectively. The UE 102 further includes control circuitry 1022, e.g., implemented by means of one or more processors and software. The control circuitry 1022 may also be at least partly implemented in hardware. For example, program code to be executed by the control circuitry 1022 may be stored in a non-volatile memory 1023. In the various examples disclosed herein, various functionality may be implemented by the control circuitry 1022, e.g.: receiving WUSs; transitioning the main receiver between an inactive state and an active state; implementing a DRX cycle of the main receiver and/or of the low-power receiver; synchronizing with a BS based on a first part of WUS; channel sensing based on a first part of a WUS; etc.

Figure 5:
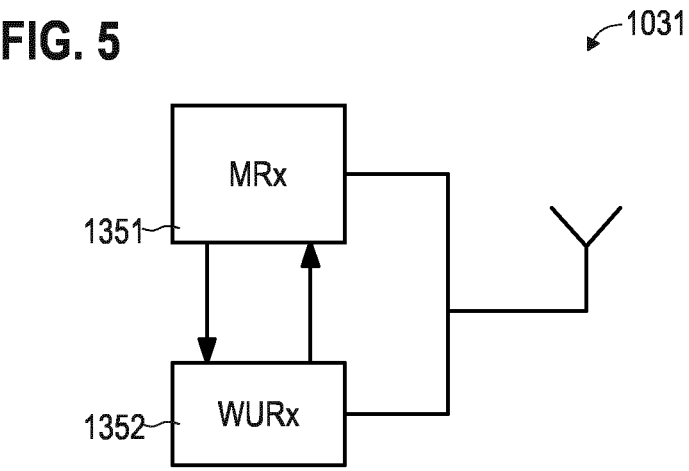
FIG. 5 schematically illustrates receivers of the UE according to various examples.

FIG. 5 illustrates details with respect to the interface 1031 of the UE 102. In particular, FIG. 5 illustrates aspects with respect to a main receiver 1351 and a low-power receiver 1352. In FIG. 5, the main receiver 1351 and the low-power receiver 1352 are implemented as separate entities. For example, they may be implemented on different chips. For example, they may be implemented in different housings. For example, they may not share a common power supply.

The scenario FIG. 5 may enable switching off some or all components of the main receiver 1351 when operating the main receiver in inactive state. In the various examples described herein, it may then be possible to receive WUSs using the low-power receiver 1352. Also, the low-power receiver 1352 may be switched between an inactive state and an active state, e.g., according to a DRX cycle.

For example, if the main receiver 1351 is switched on, the low-power receiver 1352 may be switched off, and vice-versa. As such, the main receiver 1351 and the low-power receiver 1352 may be inter-related in operation (indicated by the arrows in FIG. 5).

Figure 6:
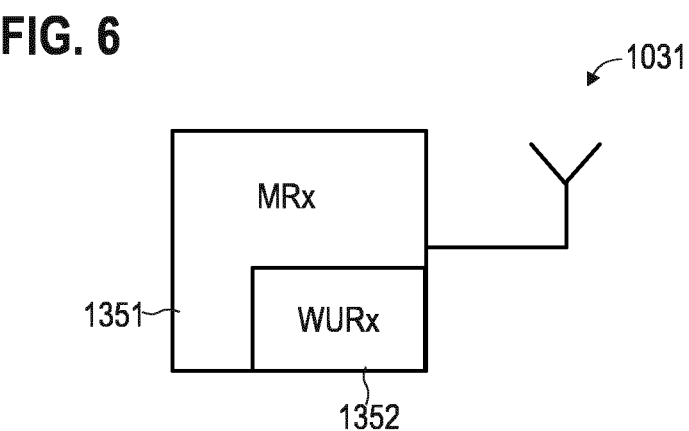
FIG. 6 schematically illustrates receivers of the UE according to various examples.

FIG. 6 illustrates details with respect to the interface 1031 of the UE 102. In particular, FIG. 6 illustrates aspects with respect to the main receiver 1351 and the low-power receiver 1352. In FIG. 6, the main receiver 1351 and the low-power receiver 1352 are implemented as a common entity. For example, they may be implemented on the common chip, i.e., integrated on a common die. For example, they may be implemented in a common housing. For example, they may share a common power supply.

The scenario FIG. 6 may enable a particular low latency for transitioning between reception—e.g., of a WUS—by the wake-up receiver 1352 and reception by the main receiver 1351.

While in FIGS. 5 and 6 a scenario is illustrated where the main receiver 1351 and the low-power receiver 1352 share a common antenna, in other examples, it would be also possible that the interface 1031 includes dedicated antennas for the main receiver 1351 and the low-power receiver 1352.

While in the examples of FIGS. 5 and 6 scenarios are illustrated where there is a dedicated low-power receiver 1352, in other examples there may be no low-power receiver. Instead, the WUS may be received by the main receiver 1351 in a low-power state. For example, the main receiver 1351 may not be fit to receive ordinary data other than the WUS in the low-power state. Then, in response to receiving the WUS, the main receiver 1351 may transition into a high-power state in which it is fit to receive the ordinary data, e.g., on PDSCH or PDCCH, etc.

Figure 7:
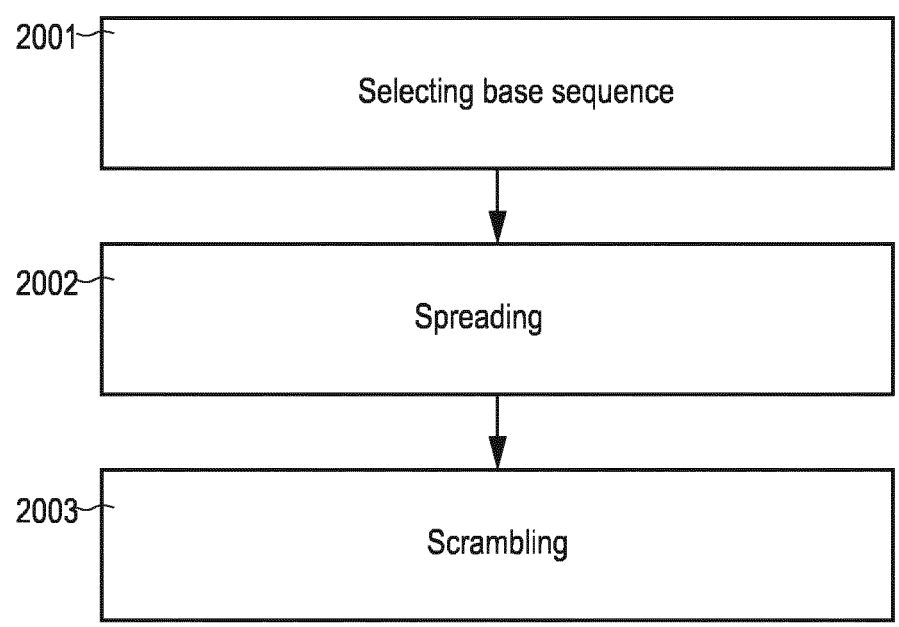
FIG. 7 schematically illustrates a method according to various examples, wherein the method is for generation of WUSs.

FIG. 7 is a flowchart of a method according to various examples. FIG. 7 illustrates aspects with respect to constructing or generating the WUS. Specifically, the method according to FIG. 7 may be used for generating a first part of the WUS and/or a second part of the WUS.

For example, the method according to FIG. 7 could be executed by the control circuitry 1012 of the BS 101. FIG. 7 illustrates aspects with respect to a sequence design of the WUS. In the various examples described herein, it may be possible to construct the WUSs according to the method of FIG. 7.

First, a certain base sequence is selected, 2001. For example the base sequence may be a randomly generated set of bits. For example the base sequence may be unique for a UE or a group of UEs. For example, the base sequence may be unique for a cell of the network 100. For example, the base sequence may be selected from the group including: a Zadoff-Chu sequence; a sequence selected from a set of orthogonal or quasi-orthogonal sequences; and a Walsh-Hadamard sequence. For example, selecting the particular base sequence or type of base sequence can be subject to sequence design of the WUS. For example, setting the sequence length of the base sequence of the WUS can be subject to sequence design of the WUS. Selecting the base sequence can be subject to sequence design of the WUS.

In some examples, it would be possible that different base sequences are selected for a first part of the WUS and a second part of the WUS. For example, the base sequence selected for the first part of the WUS may be related to a cell of the BS sending the WUS, e.g., indicative of a cell identity. Differently, the base sequence of the second part of the WUS may be related to one or more UEs to which the WUS is directed, e.g., based on identities of the UEs.

In some examples, different base sequences may be selected for different WUSs—specifically, for the second parts of the WUSs. In particular, the base sequence may be selected based on an intended recipient of the WUS, i.e., depending on the particular UE 102 to which the WUS is to be transmitted. In other words, it may be possible that the base sequence is uniquely associated with the respective UE 102 as the intended recipient of the WUS. Different UEs may be addressed by different base sequences. Hence, the base sequence may also be referred to as identity code. Thereby, it may be possible to implement, e.g., the second part of the WUS to be UE-related.

In some examples, different base sequences may be selected for different WUSs—specifically, for the first parts of the WUSs. In particular, the base sequence may be selected based on an originator of the WUS, i.e., depending on the particular BS 101 which transmits the WUS. In other words, it may be possible that the base sequence is uniquely associated with the respective BS 101 as the originator of the WUS. Different BSs or cells may be identified by different base sequences. Hence, the base sequence may also be referred to as identity code. Thereby, it may be possible to implement, e.g., the first part of the WUS to be cell-related.

Next, spreading may be applied to the base sequence, 2002. When spreading a bit sequence, the incoming bit sequence is spread/multiplied with a spreading sequence. This increases the length of the incoming bit sequence by a spreading factor K. The resulting bit sequence can be of the same length as the incoming bit sequence times the spreading factor. Details of the spreading can be set by a spreading parameter. For example, the spreading parameter may specify the spreading sequence, e.g., a length of the spreading sequence or individual bits of the spreading sequence. Setting the spreading parameter can be subject to sequence design of the WUS.

Then, scrambling may be applied to the spread base sequence, 2003. Scrambling may relate to inter-changing or transposing a sequence of the bits of the incoming bit sequence according to one or more rules. Scrambling provides for randomization of the incoming bit sequence. Based on a scrambling code, the original bit sequence can be reproduced at the receiver. Details of the scrambling can be set by a scrambling parameter. For example, the scrambling parameter can identify the one or more rules. For example, the scrambling parameter can relate to the scrambling code. Setting the scrambling parameter can be subject to sequence design of the WUS.

In some examples, it may be possible to additionally add a checksum to the WUS. Adding a checksum may be subject to sequence design of the WUS. For example, a checksum protection parameter may set whether to include or to not include the checksum. For example, the checksum protection parameter may set a length of the checksum. For example, the checksum protection parameter may set a type of the checksum, e.g., according to different error-correction algorithms, etc. The checksum may provide for joint error detection and, optionally, correction capability across the entire length of the WUS, i.e., across multiple parts of the WUS.

In some examples, it may be possible to add a preamble to the WUS. The preamble may include a sequence of preamble bits. For example, the sequence of preamble bits may have a specific length. The sequence of preamble bits may enable robust identification of the WUS, e.g., even in presence of burst errors, etc. Presence of the preamble, length of the preamble, and/or type of the preamble sequence, etc. can be properties that can be set according to a preamble parameter in sequence design of the WUS.

According to various examples described herein, one or more sequence design configurations of the method according to the example of FIG. 7 can be set differently for different parts of the WUS. For example, a different sequence design configuration may be set for the first part if compared to the second part of a WUS. For example, a more robust sequence design configuration may be set for the first part if compared for the second part; this may include a longer base sequence, and/or a longer checksum, and/or a longer scrambling code; etc. This may facilitate reliable reception of the first part, even without previous synchronization and/or channel sensing. The second part may then be received based on synchronization and/or channel sensing obtained from the first part; thus, it may not be required to apply such a high level of protection to the second part as for the first part. This reduces overhead.

Figure 8:
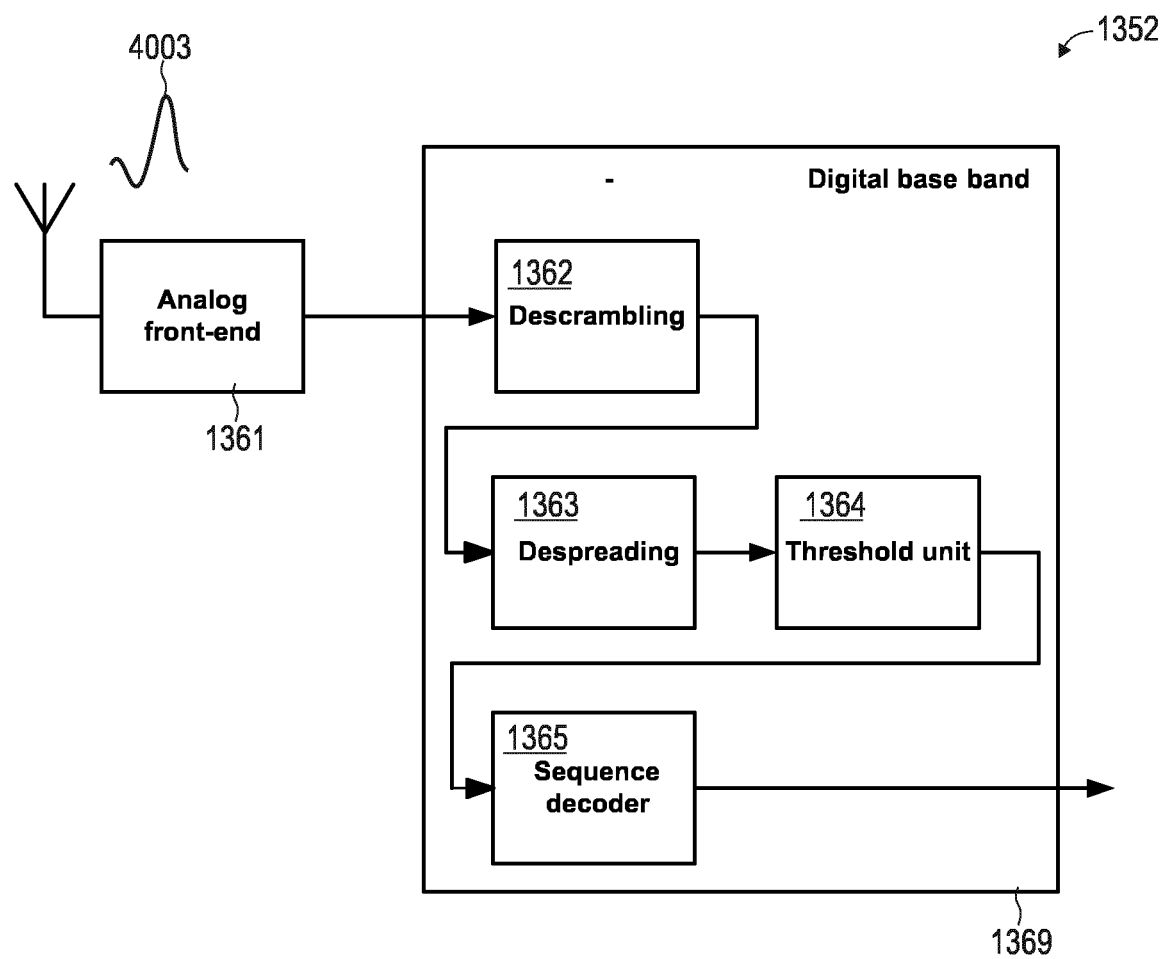
FIG. 8 schematically illustrates receiving of WUSs according to various examples.

FIG. 8 illustrates aspects with respect to the processing of a WUS 4003 received by the low-power receiver 1352. The analog front end 1361 outputs a bit sequence corresponding to the WUS 4003 in the baseband to the digital front end 1369.

Generally, the various processing blocks indicated in FIG. 8—and, as such, also the inter-related processing blocks at the transmitter, cf. FIG. 7—are optional. It is not required that for all parts of a WUS all processing blocks are executed. Different processing blocks may be executed for different parts of a WUS.

There may be provided a symbol-level buffer at the analog front end. Then, based on a demodulator, a symbol sequence in the buffer may be transformed to a bit sequence. This may mark the transition from symbol level to bit level. Bit level processing is then handled in digital domain by the digital front end.

For example, each symbol may encode one or more bits. The symbol may be defined by an amplitude and phase of the received signal, often represented in complex space. The number of bits per symbol may depend on the used modulation scheme. Sometimes, the number of bits per symbol is referred to as bit loading. The bit loading may depend on the used constellation. It would be possible that different parts of WUSs employ different bit loading.

In the various examples described herein, time-domain and/or frequency-domain processing is employed to identify the WUS 4003. Sometimes, respective processing may be with respect to a symbol sequence. Alternatively or additionally, respective processing may be with respect to a bit sequence. For example, processing may be with respect to a symbol sequence if the processing—e.g., correlation—is at the Fast Fourier Transform (FFT) output of the receiver. For example, processing may be with respect to a bit sequence if the processing—e.g., correlation—is after the demodulation output, e.g., after M-QAM or PSK output.

The processing of the WUS by the digital front end 1369 may be comparably simple—e.g., if compared to processing of a paging indicator. In legacy LTE, once the UE is scheduled a paging occasion, i.e., allocated to listen to a paging indicator, the UE is expected to be ready to decode PDCCH. Thus, the paging signal may include a temporary identity such as the P-RNTI and a PDCCH checksum which is scrambled with P-RNTI. The paging indicator may be transmitted on the PDCCH. The PDCCH computation can be energy consuming, especially in MTC.

Differently, the WUS may be transmitted independent of the PDCCH. Dedicated resources may be allocated to the WUS. The WUS may be transmitted prior to the UE accessing the PDCCH. Once the UE has detected a WUS that is assigned to that UE, then the UE may start to decode the PDCCH.

The WUS and the paging signal may employ different physical channels 261, 262. The WUS may not include reference to the P-RNTI—included in the paging signal—for UE-specific identification. The WUS may be designed so that it requires less UE computation/calculation than reception and decoding of the paging signal.

For example, with respect to the WUS, it may not be preferred to have channel coding such turbo code, convolutional code, etc. The WUS can be a robust signal, such that does not operate with higher order modulation. It can be a lower order modulation, such as On-Of-Keying (OOK), BPSK. The WUS may employ a modulation scheme that has low peak to average power ratio property. The WUS, specifically a part of the WUS related to a UE, can be a random bits and/or sequence signal that can be unique that can be assigned to a UE or group of UEs.

De-scrambling functionality 1362 then performs de-scrambling.

Next, de-spreading functionality 1363 is applied.

A threshold unit 1364 is provided next.

A sequence decoder 1365 employs a decoding algorithm to the bit sequence. Finally, the base sequence employed at the transmitter is thus reassembled.

It is then possible to perform a cross-correlation between the base sequence and a reference sequence. If the cross correlation yields a significant result, it can be judged that the WUS 4003 was addressed to the particular UE 102 and possibly further UEs. Based on said cross correlating, it is then possible to selectively transition the main receiver 1351 from an inactive state to an active state.

By means of spreading and/or scrambling of the base sequence, more reliable crosscorrelation can be performed. For example, by spreading the base sequence, a longer sequence is obtained for the WUS 4003 transmitted over the air. Longer sequences generally are more robust to false positives when performing the crosscorrelation.

In some examples, different processing may be employed for different parts of the WUS. For example, it would be possible that for the first part of the WUS less complex processing is employed if compared to the second part of the WUS. For example, it would be possible that processing of the first part of the WUS is on symbol level; while processing of the second part of the WUS is on bit level. For example, it would be possible that the first part of the WUS is processed by a correlation between the received symbol sequence and one or more candidate sequences; this correlation can be in time domain and/or frequency domain. The correlation may be implemented by analog hardware. Then, no bit-level analysis may be required. This may be in contrast to processing of the second part of the WUS; here, bit-level processing including descrambling 1362 and/or de-spreading 1363 and/or decoding 1365 and/or threshold comparison 1364 may be employed. This is implemented in digital domain.

In further examples, it would be possible that the analog hardware employed for the analog front-end 1361 is different for processing of different parts of WUSs. For example, less complex time-domain and/or frequency-domain correlation/analog-digital-conversion may be employed for receiving the first part; while more complex correlation may be employed for receiving the second part. For example, more correlators may be employed when receiving the second part of a WUS, if compared to receiving a first part of a WUS.

In still further examples, it would be possible that the processing of the first part, as well as the processing of the second part includes bit-level operations; however, different types or different implementations of bit-level operations may be employed. For example, the scrambling code and/or the de-spreading and/or the de-coding may be configured differently for the different parts. For example, it would be possible that descrambling 1362 is employed for the first part and the second part; but that dispreading and decoding 1363, 1365 is only applied for the second part, but not for the first part, etc.

Figure 9:
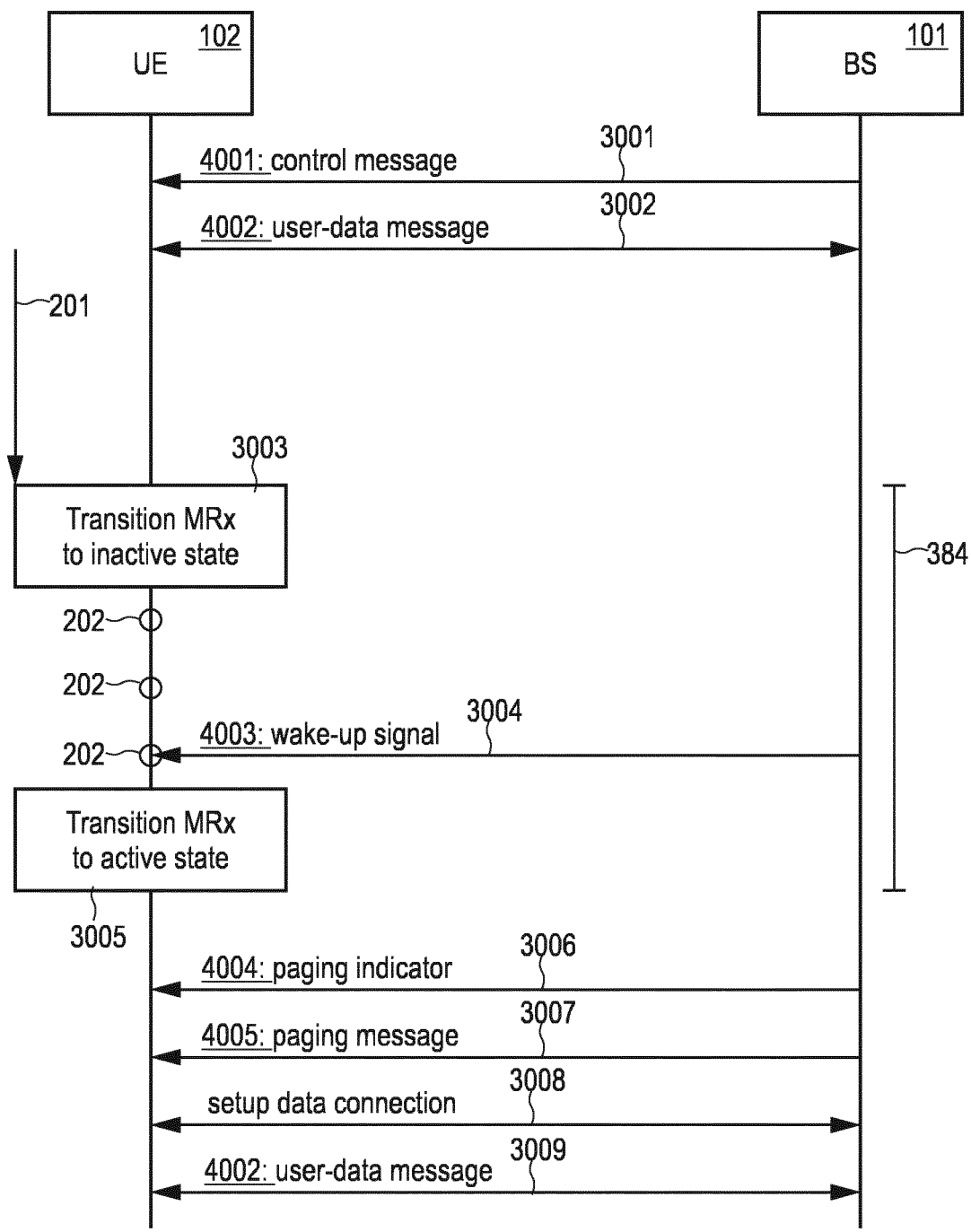
FIG. 9 is a signaling diagram of signaling between the UE and the BS according to various examples.

FIG. 9 is a signaling diagram. FIG. 9 illustrates aspects with respect to communicating between the UE 102 and the BS 101. FIG. 9 illustrates aspects with respect to transmitting and/or receiving (communicating) a WUS 4003. According to the various examples described herein, such techniques as described with respect to FIG. 9 may be employed for communicating WUSs 4003. In particular, FIG. 9 also illustrates aspects with respect to the inter-relationship between communication of a WUS and communication of paging signals and messages 4004, 4005 that may be employed in the various examples described herein.

At 3001, a control message 4001 is communicated. For example, the control message may be communicated on the control channel 262, e.g., PDCCH. For example, the control message may be a Layer 2 or Layer 3 control message. The control message may be relate to RRC/higher-layer signaling. For example, the control message 4001 may be broadcasted, e.g., in a system information block associated with a cell.

The control message 4001—which may be used in the various examples described herein—may be indicative of certain properties associated with the wake-up technology implemented by the UE 102. For example, the control message may configure a level of robustness of at least one part of the WUS. For example, the control message 4001 may be indicative of a modulation and/or coding scheme (MCS) employed for the WUS. For example, the control message 4001 may be indicative of a length of a base sequence of the WU. For example, the control message 4001 may be indicative of the sequence design configuration of the WUS 4003. By implementing the control message 4001 to be indicative of the sequence design configuration of the WUS 4003, it is possible to dynamically adjust the sequence design configuration of the WUS 4003.

Communicating, at 3001, the control message 4001 is optionally. Generally, various properties and/or dependencies of the sequence design configuration of the WUS may be pre-configured. Then, there may be no need for explicit control signaling.

At 3002, a user-data message 4002 is communicated. For example, the user-data message 4002 may be communicated on the payload channel 263. For example, the user-data message 4002 may be communicated along the data connection 160, e.g., as part of a bearer, etc.

Then, there is no more data to be communicated between the UE 102 and the BS 101. Transmit buffers are empty. This may trigger a timer. For example, the timer may be implemented at the UE 102. After a certain timeout duration set in accordance with the inactivity schedule 201, the main receiver 1351 of the UE 102 is transitioned into the inactive state 384 from the active state, 3003. This is done in order to reduce the power consumption of the UE 102. For example, prior to the transitioning the main receiver 1351 to the inactive state 384, it would be possible to release the data connection 160 by appropriate control signaling on the control channel 262 (not illustrated in FIG. 9). 4001 and 4002 are communicated with the main receiver 1351. The inactivity schedule 201 is an example implementation of a trigger criterion for transitioning into the inactive state 384; other trigger criteria are possible.

Multiple wake-up occasions for communicating the WUS 4003 are then implemented by reoccurring resources 202. For example, the resources 202 may be radio resources defined in a time-frequency grid used for communication with the main receiver 1951; this avoids interference with further UEs communicating with the BS 101. The wake-up occasions may be arranged in paging frames.

At some point in time, the BS 101 transmits a WUS 4003, 3004. This may be because there is DL data—e.g., payload data or control data—scheduled for transmission to the UE 102 in a transmit buffer. Another trigger criteria for transmitting the WUS 4003 are conceivable. The WUS 4003 is received by the UE 102.

In response to receiving the WUS 4003, the main receiver 1351 of the UE 102 is transitioned to the active state, 3005.

Then, at 3006, a paging indicator 4004 is transmitted by the BS 101 to the UE 102. The paging indicator 4004 is received by the main receiver 1351. For example, the paging indicator may be transmitted on channel 262, e.g. PDCCH. For example, the paging indicator may include a temporary or static identity of the UE 102. The paging indicator or may be indicative of a plurality of UEs, because the indicator may be derived from unique identities of the UEs such as the International Mobile Subscriber Identity (IMSI) or the like in an ambiguous manner. Examples of the identity of one or more UEs that may be included in paging indicator 4004 may include a Paging Radio Network Temporary Identifier (P-RNTI) in the 3GPP LTE framework. The P-RNTI may not refer to a particular UE, but to a group of UEs. The P-RNTI may be derived from the IMSI of the subscriber to be paged and constructed by the BS.

For example, in case the WUS is already UE specific, this paging indicator may be just a control message and include Cell Radio Network Temporary Identifier (C-RNTI), e.g., instead of the P-RNTI. For example, it is possible that the paging indicator does not include a UE-related indicator, but merely includes, e.g., a cell-related indicator.

The paging indicator 4004 may also include information on a MCS used for communicating a paging message 4005 at 3007. The paging message 4005 may be communicated on a shared channel 263, e.g., PDSCH. Generally, the paging indicator 4004 and the paging message 4005 may be communicated on different channels. The paging message 4005 may be modulated and encoded according to the MCS indicated by the paging indicator 4004. Thus, it may be required that the UE 102 receives, firstly, the paging indicator 4004 and, secondly, the paging message 4005.

Then, at 3008, a data connection 160 is set up between the UE 102 and the BS 101. This may include a random access procedure and a Radio Resource Control (RRC) set up.

Finally, a UL or DL user-data message 4002 is communicated using the newly set up data connection 160 at 3009.

As will be appreciated from FIG. 9, upon transitioning the main receiver 1351 to the active state at 3005, the data connection 160 needs to be re-established. For this reason, the UE 102 operates in idle mode—when no data connection 160 is set up or maintained—during the inactive state 384 of the main receiver 1351. However, in the various examples described herein, other implementations of the particular mode in which the UE 102 operates during the inactive state 384 are conceivable.

Figure 10:
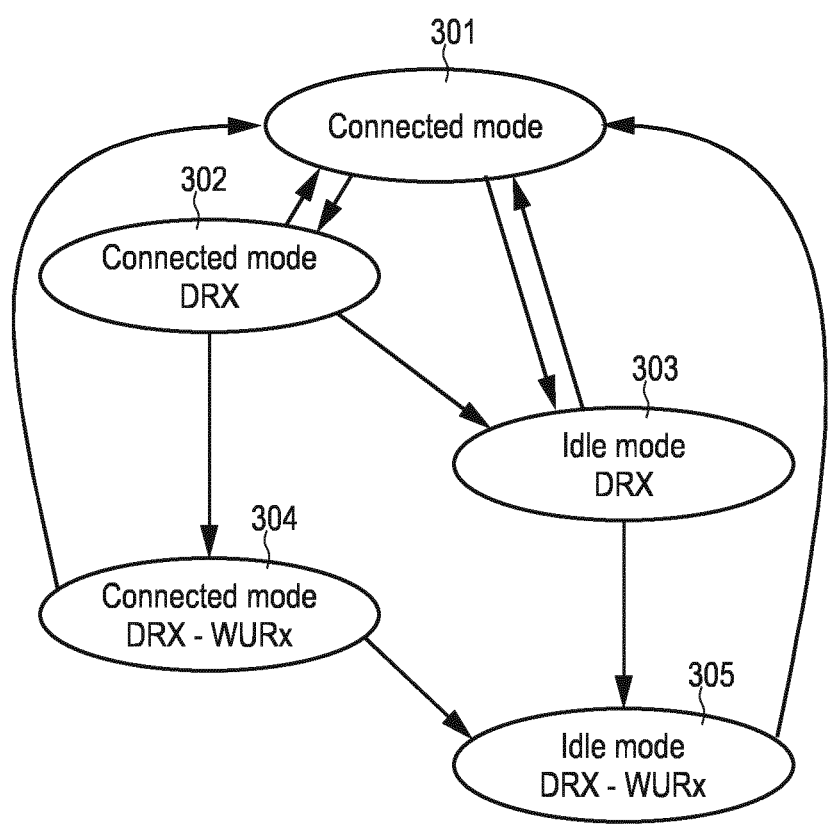
FIG. 10 schematically illustrates modes in which the UE can be operated according to various examples.

FIG. 10 illustrates aspects with respect to different modes 301-305 in which the UE 102 can operate. FIG. 10 also illustrates aspects with respect to association of communication of WUSs and paging signals with the various modes 301-305. In the various examples described herein, it is possible that the WUSs are communicated in certain operational modes 304, 305 of the UE 102.

During connected mode 301, a data connection 160 is set up. For example, a default bearer and optionally one or more dedicated bearers may be set up between the UE 102 and the network 100. In order to reduce the power consumption, it is then possible to transition from the connected mode 301 to a connected mode 302 which employs a DRX cycle of the main receiver 1351. The DRX cycle includes on durations and off durations. During the off durations, the main receiver 1351 is unfit to receive data. The timing of the DRX cycle is synchronized between the UE 102 and the BS 101 such that the BS 101 can align any DL transmission with the on durations of the connected mode DRX cycle. The bearer/data connection 160 is maintained set-up in mode 302.

To achieve a further power reduction, it is possible to implement in idle mode 303. The idle mode 303 is, again, associated with the DRX cycle of the main receiver 1351 of the UE 102. However, during the on durations of the DRX cycle in idle mode 303, the main receiver 1351 is only fit to receive paging indicators and, optionally, paging messages. For example, this may help to restrict the particular bandwidth that needs to be monitored by the main receiver 1351 during the on durations of the DRX cycles in idle mode 303. This may help to further reduce the power consumption—e.g., if compared to the connected mode 302.

In modes 301-303 the main receiver 1351 is operated in the active state. The low-power receiver 1352 is not required.

In the example of FIG. 10, two more modes 304, 305 are illustrated. Both modes 304, 305 relate to scenarios where the main receiver 1351 is operated in the inactive state 384. Hence, during the modes 304, 305, the main receiver 1351 is persistently switched off and, in particular, not switched on during any on durations. Differently, during the modes 304, 305, the low-power receiver 1352 is at least sometimes operating in an active state, e.g., according to a respective DRX cycle of the low power receiver 1352.

In mode 304, the data connection 160 is maintained between the UE 102 and the network 100. For example, respective registry entries may be maintained by the UE 102 and the network 100, e.g., at a core-network mobility node such as the MME 116. Transition into mode 304 may be determined by the inactivity schedule 201. In mode 304, it would be possible that a further signal which is communicated in response to communicating the WUS directly encodes a user-data message associated with the data connection 160. No random access procedure is required. Thus, in such an example, the data connection 160 between the network 100 and the UE 102 may be established and the WUS may then be communicated while the connection 160 is established. In such a scenario, the BS 101 may have to select between transmitting a DL scheduling grant indicative of resources allocated to a DL user-data message on the DL shared channel and transmitting the WUS, depending on the inactivity schedule 201 of the main receiver 1251. The UE 102, in mode 304, is not required to repeatedly listen for DL control information (DCI). Mode 304 offers low-latency transmission of payload data, possibly at the expense of more complicated bookkeeping, e.g., by the BS 101.

Differently, in the mode 305, the data connection 160 is not maintained between the UE 102 and the network 100. A random access procedure, triggered by paging, may be required (cf. FIG. 10).

In the example of FIG. 10, scenarios are illustrated in which both low-power receiver modes 304, 305 implement a DRX cycle of the low-power receiver 1532. Hence, the WUS 4003 is communicated in accordance with the timing of the DRX cycle. However, generally, it would also be possible to implement the modes 304, 305 such that the low-power receiver 1352 is persistently fit to receive WUSs, i.e., does not implement on durations and off durations.

Figure 11:
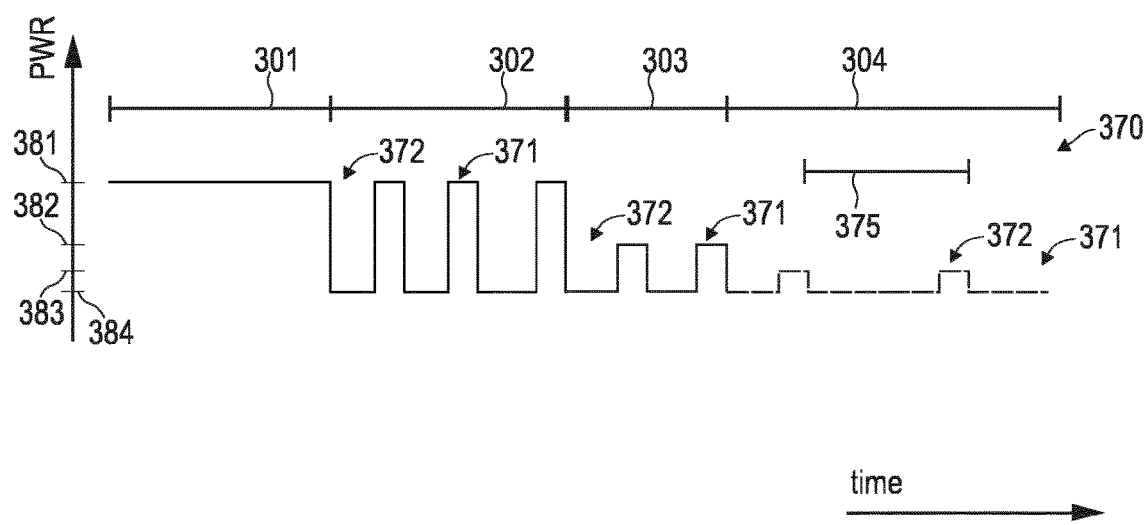
FIG. 11 schematically illustrates operation of a receiver of the UE in different states according to a discontinuous reception cycle and according to the modes according to various examples.

FIG. 11 illustrates aspects with respect to switching between the different modes 301-305. Furthermore, FIG. 11 illustrates aspects of employing DRX cycles 370. It is possible to employ such techniques in the various examples described herein with respect to communication of WUSs.

First, the UE 102 operates in the connected mode 301. This causes a persistent power consumption at a high level, because the main receiver 1351 persistently operates in the active state 381. The active state 381 is associated with a certain power consumption. Then, in order to reduce the power consumption, the connected mode 302 employing DRX is activated. Here, the on durations 371 and the off durations 372 of the main receiver 1351—selectively operating in the active state 381 and the inactive state 384—are illustrated.

To further reduce the power consumption, next, the idle mode 303 is activated. This is accompanied by releasing the data connection 160. Again, the idle mode 303 employs a DRX cycle including on durations 371 and off durations 372. The on durations 371 in mode 303 are associated with a lower power consumption if compared to the on durations 371 in connected mode 302, because in the idle mode 303, the capability of the main receiver 1351, now operating in the active state 382, can be reduced if compared to the connected mode 302. During idle mode 303 when in active state 382, the main receiver 1351 only expects reception of paging signals.

Finally, to even further reduce the power consumption, the idle mode 305 is activated. Upon transitioning into the idle mode 305, the main receiver 1351 is persistently transitioned from the active states 381, 382 to the inactive state 384. A DRX cycle 370 is again implemented including on durations 371 and off durations 372 according to a DRX cycle length 375; here the on durations 371 define wake-up occasions. The DRX cycle is implemented by switching the low-power receiver 1352 between the active state 383 and the inactive state 384 (dashed line in FIG. 11).

The various states 381-384 are examples only. For illustration, it would be possible that the main receiver is not transitioned into the fully inactive state 384 when in DRX connected mode 302; rather, in the OFF durations 372, an intermediate state between 381 and 384 could be assumed.

Figure 12:
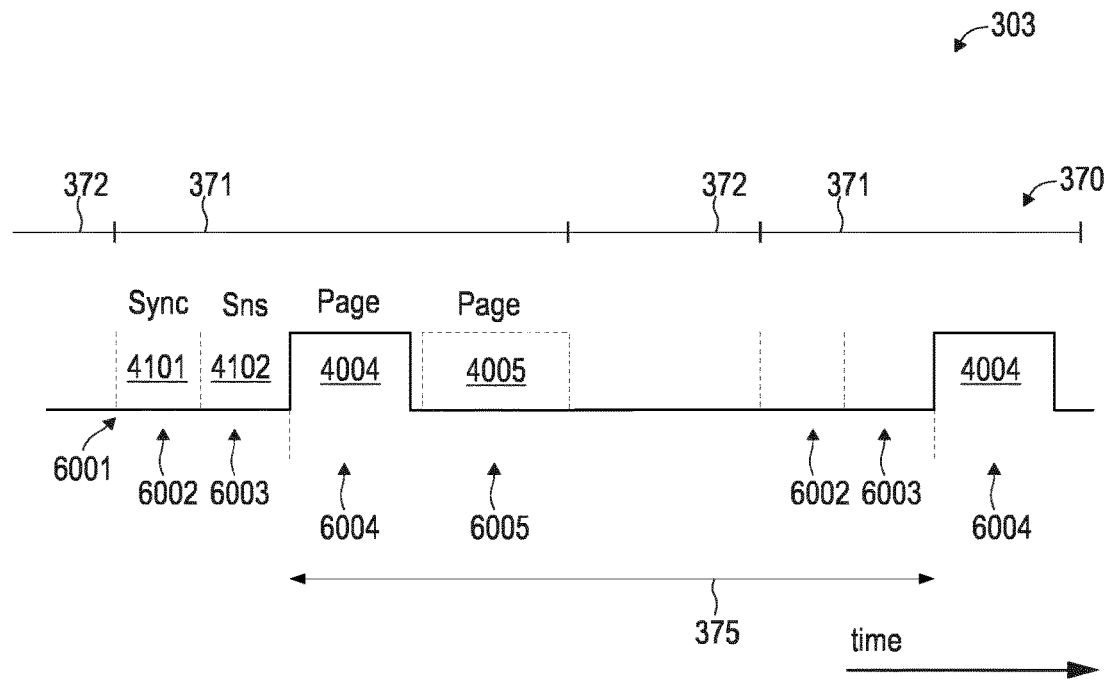
FIG. 12 schematically illustrates paging of the UE according to various examples.

FIG. 12 illustrates aspects with respect to operating the UE in idle mode 303. Specifically, FIG. 12 illustrates aspects with respect to listening for a paging signal/indicator 4004 and a paging message 4005. FIG. 12 also illustrates aspects with respect to synchronizing the UE 102 and the BS 101 and performing channel sensing, according to reference implementations.

At 6001, the off duration 372 expires and the on duration 371 begins. At this point, the receiver 1351 of the UE 102 is transitioned into the active state 382 in which it is fit to receive a paging signal 4004 (cf. FIG. 11). Prior to receiving the paging signal 4004, however, the UE 102, via the receiver 1351, receives a synchronization signal at 6002.

The synchronization signal 4101 is broadcasted by the BS 101 according to a repetitive timing pattern. For example, it would be possible that a synchronization signal is broadcasted by the BS 101 in predefined resource elements of a time-frequency resource mapping. Synchronization signals may be repeatedly broadcasted in multiple subframes of a transmission frame. Typically, the repetition rate of the synchronization signals may be in the order of 1 ms-20 ms, typically around 5 ms. The synchronization signal 410 may be a PSS or SSS:

Based on the synchronization signal, it is possible to synchronize the BS 101 and the UE 102, both, in time domain and frequency domain.

Next, at 6003, a reference signal 4102—sometimes also referred to as pilot signal or channel reference signal (CRS)—is received. The reference signal 4102 may be broadcasted at a certain repetition rate, e.g., in the same order as explained above for the synchronization signal 4101. An example reference signal 4102 is described in 3GPP TS 36.211 V.14.0.0 (2016-09), section 5.5.

Based on the reference signal 4102, channel sensing can be performed. The channel sensing facilitates measurement of the communication reliability on a channel between the BS 101 and the UE 102. For example, in a cell edge scenario, the quality of the channel may be deteriorated such that the reliability of communicating on the channel is particularly low. Then, a search for one or more further cells offering a better quality channel may commence (not illustrated in FIG. 12).

If, however, the reliability of communicating on the channel between the UE 102 and the BS 101 is sufficient, then, at 6004, a paging signal 4004 may be received. The paging signal 4004 may include an indicator associated with the UE 102; then, a paging message 4005 may be received at 6005. In the scenario of FIG. 12, the particular UE 102 is not paged at 6004 such that the paging message 4005 is not received. Thus, the receiver 1351 is again transitioned into the inactive state 384 during the following off duration 372. Blind decoding on the PDSCH for receiving the paging message 4005 is not required.

Figure 13:
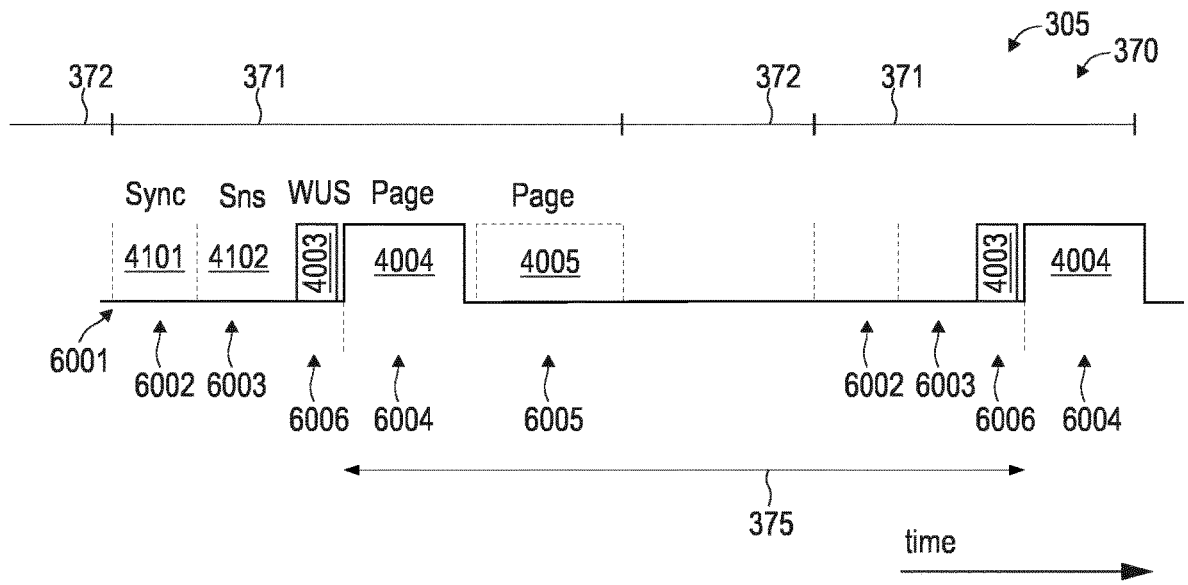
FIG. 13 schematically illustrates paging of the UE using a WUS according to various examples.

FIG. 13 illustrates aspects with respect to operating the UE in idle mode 305. Specifically, FIG. 13 illustrates aspects with respect to listening for a WUS 4003, a paging signal 4004, and a paging message 4005. FIG. 13 also illustrates aspects with respect to synchronizing the UE 102 and the BS 101 and with respect to channel sensing, according to reference implementations.

The scenario of FIG. 13 generally corresponds to the scenario of FIG. 12. However, in the scenario of FIG. 13, prior to receiving the paging signal 4004 at 6004, a WUS 4003 is received at 6006. The WUS 4003 is communicated time-aligned with the DRX cycle 370. For being able to receive the WUS at 6006, at 6002, the synchronization signal 4101 broadcasted by the BS 101 is received and, at 6003, the reference signal 4102 broadcasted by the BS 101 is received.

In the scenarios of FIGS. 12 and 13, reception of the paging signal 4004 is delayed by the need to provision sufficient time for receiving the synchronization signal 4101 and the reference signal 4102. Also, the power consumption for receiving the synchronization signal 4101 and the reference signal 4102 is significant. Therefore, according to examples described herein, it is possible to use an advanced WUS which renders reception of the synchronization signal 4101 and the reference signal 4102 unnecessary. Details with respect to such a WUS are discussed in connection with FIG. 14.

Figure 14:
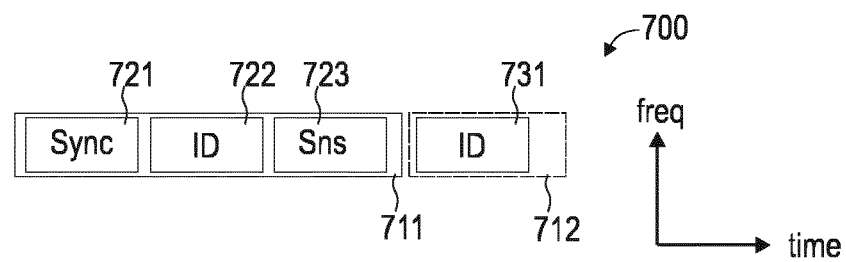
FIG. 14 schematically illustrates a WUS according to various examples.

FIG. 14 illustrates aspects with respect to a WUS 700. The WUS 700 includes a first part 711 and a second part 712. In the example of FIG. 14, the first and second parts 711, 712 occupy the same frequency and are transmitted in immediate succession.

The first part 711 may be related to the cell associated with the BS transmitting the WUS 700. Differently, the second part 712 may be related to one or more UEs 102 to which the WUS 700 is addressed. Generally, the second part 712 is optional.

For example, the first part 711 and the second part 712 may share a common checksum. As such, the checksum may be based, both, on data of the first part 711 and data of the second part 712. This reduces overhead.

For example, it would be possible that the first part 711 of the WUS 700 includes a synchronization signal 721 for time-frequency synchronization of the BS 101 and the UE 102. As such, the synchronization signal 721 included in the first part 711 may implement functionality according to the synchronization signal 4101 broadcasted by the BS 101. Yet, because the synchronization signal 721 is included in the WUS 700, the repetition rate of the synchronization signal 721 may strongly vary from the repetition rate of the synchronization signal 4101: typically, the periodicity 375 of the DRX cycle in modes 304, 305 may be larger than 1 minute, optionally larger than 10 minutes; while the periodicity of the broadcasted synchronization signal 4101 may be smaller than 50 ms, optionally smaller than 5 ms.

The first part 711 of the WUS 700 may also include a reference signal 723 for channel sensing of the channel between the BS 101 and the UE 102. The reference signal 723 may generally correspond to the reference signal 4102 in that they may implement corresponding functionality with respect to channel sensing; however, in a manner comparable to what has been described above with respect to the synchronization signals 721, 4101, the periodicity of the broadcasted synchronization signal 4102 may be on the order of a couple of milliseconds—while the periodicity of the synchronization signal 721 included in the first part 711 may be on the order of minutes, because it is transmitted time-aligned with the DRX cycle 370.

Alternatively or additionally, it would be possible that the first part 711 of the WUS 700 includes a cell identity 722 of a cell associated with the BS 101 transmitting the WUS 700. In some scenarios, the cell identity 722 may be encoded into the synchronization signal 721 and/or the reference signal 723. Based on the cell identity, it is possible to track mobility of the UE 102.

As will be appreciated from the above, the synchronization signal 721, the reference signal 723, and the cell identity 722 are all not specific to the UE 102 as intended recipient of the WUS 700. As such, the first part 711 is related to the cell of the BS 101 transmitting the WUS 700; rather than to the UE 102 as intended recipient. This is different for the second part 712.

Illustrated in FIG. 14 is a scenario in which the second part 712 of the WUS 700 includes an identity 731 of one or more UEs. This helps to address individual UEs or a group of UEs in connection with a potential subsequent paging signal 4004. As, such the second part 712 may be related to one or more UEs.

For generating the first part 711 of the WUS 700, techniques as described in connection with FIG. 7 can be employed. Likewise, for generating the second part 712 of the WUS 700, techniques described in connection with FIG. 7 may be employed. Different sequence design configurations may be selected for the different parts 711, 712. For example, a cell-specific base sequence may be selected when generating the first part 711; while a UE-specific base sequence may be selected when generating the second part 712. It would be possible that the length of the base sequence, the number of CRC bits, the spreading factor, the particular type of sequence generator used, etc.—or generally, the sequence design—is selected differently for the first part 711 and for the second part 712. Specifically, it would be possible that a more robust sequence design configuration is selected for the first part 711 if compared to the second part 712, in order to enable reliable reception of the first part 711 even prior to obtaining synchronization between the UE 102 and the BS 101.

Alternatively or additionally, it would also be possible that the sequence design is selected as a function of the DRX periodicity 375. For example, the longer (shorter) the DRX periodicity 375, the more robust (less robust) the sequence design. For example, for a longer DRX periodicity 375—in the relevant mode 304, 305 in which WUSs are communicated time-aligned with the DRX cycle 370—, a longer base sequence, a larger count of CRC bits, and/or more robust spreading factors may be selected if compared to a shorter DRX periodicity 375. This is based on the finding that the timing drift/clock drift between the UE 102 and the BS 101 is likely to be larger for longer DRX periodicities 375; and that, therefore, more robust sequence design helps to compensate for increased timing drift in case a long DRX periodicity 375 is encountered. Also, UE mobility is more likely to occur for longer DRX periodicities 375. Then, a longer reference signal 723 may help to accurately perform channel sensing. Hence, generally, a length of the first part 711 may correlate with the periodicity 375 of the DRX cycle 370.

In FIG. 14 a scenario is illustrated in which a distinct synchronization signal 721 and a distinct reference signal 723 is included in the WUS 700. In other examples, it would be possible that synchronization and channel sensing are facilitated by the reference signal included in the WUS 700. In such example, the preamble, i.e., the first part 711, may consist of a reference signal only, which provides means for synchronization and channel sensing.

Figure 15:
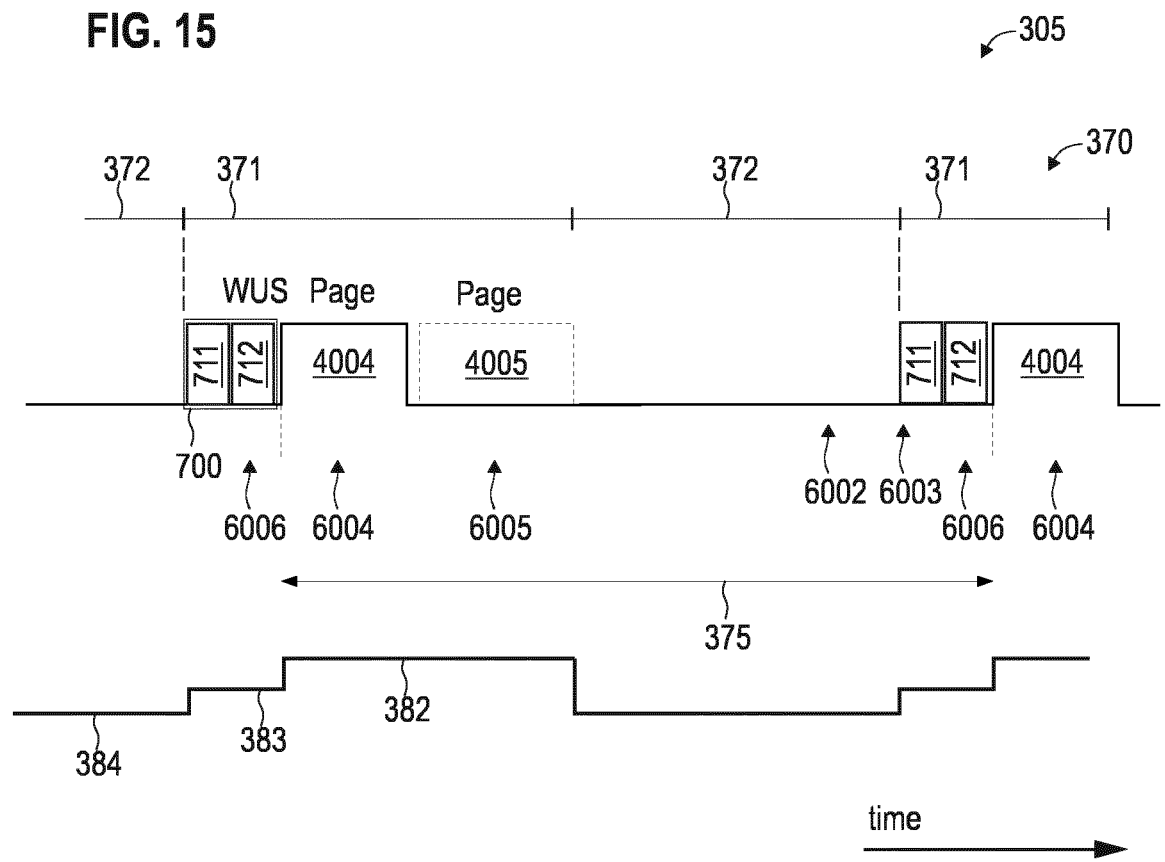
FIG. 15 schematically illustrates paging of the UE using a WUS including a first part and a second part according to various examples.

FIG. 15 illustrates aspects with respect to operating the UE in idle mode 304. Specifically, FIG. 15 illustrates aspects with respect to listening for a WUS 4003 including a first part 711 and a second part 712, a paging signal 4004, and a paging message 4005. The first part 711 of the WUS 700 is received in response to transitioning the respective receiver 1351, 1352 responsible for receiving the WUS 700 from the inactive state 384 to the active state 384 (cf. FIG. 11).

The scenario of FIG. 15 generally corresponds to the scenario of FIG. 13. Again, the WUS 700 is communicated time-aligned with the DRX cycle 370 of the UE 102. The WUS 700 is transmitted by the BS 101 and received by the UE 102. However, it is possible that the UE 102 is synchronized with the BS 101 based on the synchronization signal 721 included in the first part 711 of the WUS 700; and then, based on said synchronizing, receives the second part 712 of the WUS. If synchronizing based on the synchronization signal 721 fails, then the second part 712 of the WUS 700 is not received. Specifically, the second part 712 of the WUS 700 may not be decoded correctly. Hence, the second part 712 is selectively received based on said synchronizing.

As will be appreciated from a comparison of FIGS. 13 and 15, in the scenario FIG. 15, the UE 102 does not synchronize with the BS 101 between transitioning the receiver 1351, 1352 for receiving the WUS 700 from the inactive state 384 to the active state 383 and until receiving of the first part 711 of the WUS 700. In other words, it is not required to receive any broadcasted synchronization signal 4101 prior to receiving the first part 711 of the WUS 700. Rather, the first part 711 of the WUS 700 is received in response to transitioning the receiver 1351, 1352 of the UE 102 for receiving the WUS 700 from the inactive state 384 to the active state 383. There may be no further trigger conditions required before receiving the WUS 700 and response to transitioning the receiver 1351, 1352 to the active state 383. This reduces latency and reduces power consumption at the UE 102.

Additionally, based on the reference signal 723 or based on a combination of the synchronization signal 721 and the reference signal 723 included in the first part 711 of the WUS 700, the UE 102 performs channel sensing of the channel between the BS 101 and the UE 102. The channel may relate to the characteristics of the electromagnetic waves exchanged between the UE 102 and the BS 101 along the wireless link 111. Then, depending on a result of said channel sensing, the second part 712 of the WUS 700 is received or not received, i.e., selectively received. For example, if the quality of the channel sensing indicates a quality below a threshold, i.e., a degraded communication reliability, the no attempt for receiving the second part 712 of the WUS 700 may be made. Differently, if the quality of the channel sensing indicates a quality above the threshold, i.e., an acceptable communication reliability, then, an attempt for receiving the second part 712 of the WUS 700 may be made.

For example, if the result of said channel sensing indicates a degraded communication reliability, then it would be possible to pursue a fallback strategy. Such a fallback strategy may include receiving one or more periodically broadcasted further reference signals 4102, e.g., in order to identify one or more other suitable BSs. A similar option may be available where it is not possible to obtain synchronization based on the first part 711 of the WUS.

It would be possible that the cell identity 722 included in the first part 711 of the WUS 700 is compared with a reference cell identity. For example, the reference cell identity may correspond to the identity of the cell on which the UE 102 camped in the previous on durations 371 of the DRX cycle. Then, if there is a match between the reference cell identity and the cell identity 722, it can be assumed that UE mobility has not occurred; likewise, if there is a mismatch between the reference cell identity and the cell identity 722, it can be assumed that UE mobility has occurred. Depending on such a comparison of the cell identity 722 and the reference cell identity, it is possible to selectively receive the second part 712 of the WUS 700. For example, if there is a mismatch, then it may not be required to receive the second part 712 of the WUS 700, because UE mobility has occurred and other checks with respect to UE mobility have to be performed first.

Such selective reception of the second part 712 may help to reduce power consumption at the UE 102. Specifically, because unnecessary decoding attempts may be avoided— e.g., in case of degraded channel quality or UE mobility or missing synchronization—, on average, the power consumption at the UE 102 can be reduced.

Figure 16:
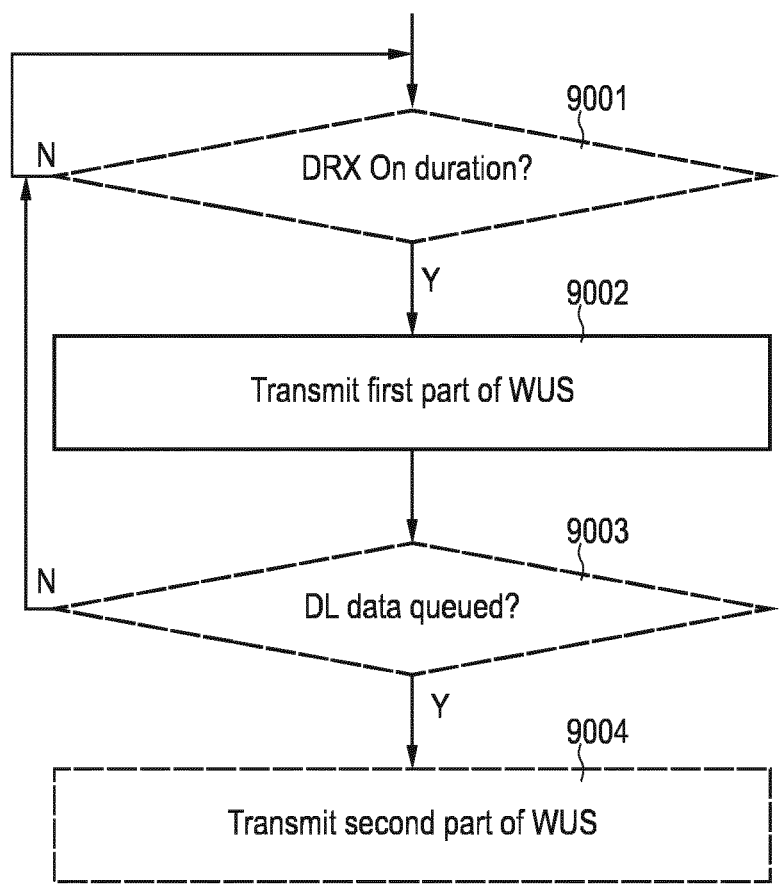
FIG. 16 is a flowchart of a method according to various examples.

FIG. 16 is a flowchart of a method according to various examples. For example, the method according to the example of FIG. 16 could be executed by the BS 101, e.g., by the control circuitry 1012 of the BS 101.

First, at block 9001, it is checked whether and on duration of a DRX cycle has commenced.

If an on duration of the DRX cycle has commenced, a cell-related first part of a WUS is transmitted, block 9002. Hence, the WUS 700 is communicated time-aligned with the DRX cycle.

For example, the WUS 700 according to the examples of FIGS. 14 and 15 could be transmitted. For generating the first part of the WUS, techniques according to the method of FIG. 7 may be employed. The sequence design may be a function of the DRX periodicity, e.g., to tailor robustness depending on the likelihood of UE mobility, timing drift, etc.

Next, at block 9003 it is checked whether there is downlink data queued for a given UE, e.g., application-layer data, also sometimes referred to as payload data. If there is no downlink data queued, then the method commences with block 9001. If there is downlink data queued, then a UE-related second part of the wake up signal is transmitted, block 9004. For example, the second part of the WUS may include an identity of the respective UE for which there is downlink data queued.

Other methods could be considered than the example flowchart in FIG. 16. For example, a method could be executed where the block 9001 and 9003 are performed in one occasion. If the DRX cycle has commenced, e.g., if an ON duration of the DRX cycle has started, and there is no data queued, only the first part 9002 is transmitted, and if there is data the two parts 9002 and 9004 are transmitted consecutively.

For generation of the second part of the WUS, techniques as described in connection with FIG. 7 may be employed.

Figure 17:
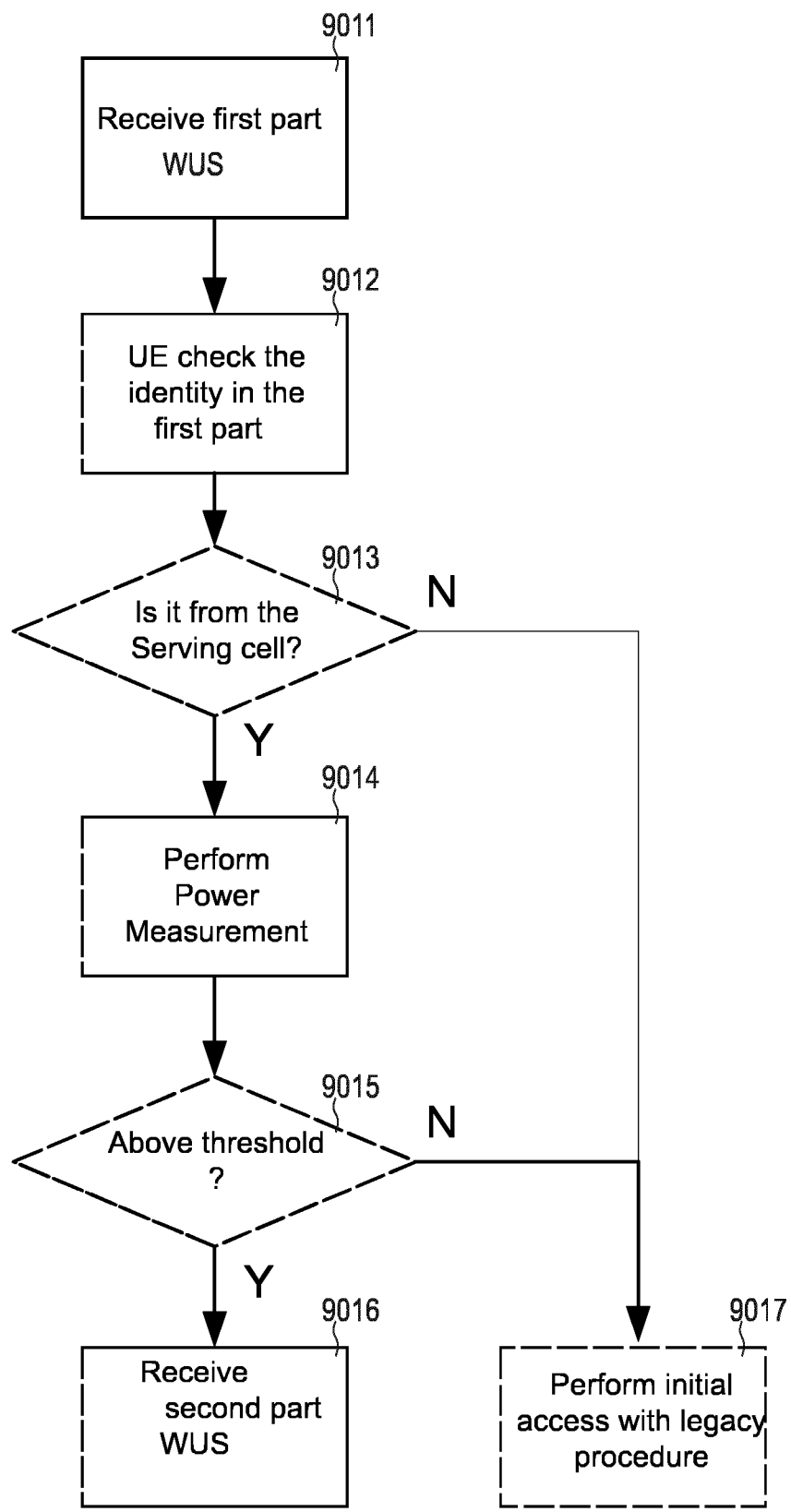
FIG. 17 is a flowchart of a method according to various examples.

FIG. 17 is a flowchart of a method according to various examples. For example, the method according to FIG. 17 may be executed by the control circuitry 1022 the UE 102. Optional blocks are denoted with dashed lines.

At block 9011, the UE receives a first part of the WUS. This may include obtaining a signal form on the physical layer via an analog front end and decoding the signal form (cf FIG. 8).

The first part of the WUS includes an identity of a cell associated with the BS transmitting the WUS. At block 9012, this identity is retrieved and, at block 9013, checked, e.g., compared to one or more reference cell identities.

If it is judged that the cell identity corresponds to the previously serving cell, then, at block 9014, channel sensing is performed. In the example of FIG. 16, this includes a power measurement. Generally, the channel sensing may be based on a reference signal including the first part of the WUS.

At block 9015, the result of the channel sensing is compared with a threshold; specifically, in the example of FIG. 16 it is checked whether the sensed power is above a threshold.

Blocks 9014 and 9015 are optional. For example, in another implementation, if—at 9013 the cell identity is correctly identified—the method may directly commence with 9016.

If this is the case, then the second part of the WUS is received, block 9016. This may include decoding the corresponding part of the signal form retrieved via the analog front end. The second part of the WUS is related to the UE and may include a respective identity.

If at block 9013 it is judged that the WUS originates from a BS associated with a different cell, then a fallback procedure is triggered at block 9017. Specifically, in the example of FIG. 16, an initial access with the legacy procedures—including receiving of broadcasted synchronization signals and/or broadcasted reference signals and/or performing a random access procedure—is executed. Block 9017 is also executed if the channel sensing checked at block 9015 indicates an insufficient quality. An alternative implementation of block 9017 would include cell re-selection for finding a new cell.

Summarizing, above techniques of communicating WUSs have been described. The WUS includes a first part and a second part. The second part may be related to one or more UEs; while the first part may implement preamble functionality to avoid robust reception of the second part. This preamble functionality may include time-domain and/or frequency domain synchronization, mobility detection based on cell identity, and/or channel sensing. As such, the first part may be the same for all UEs served by the BS of the respective cell, i.e., may be cell related.

The first part may include information related to the cell identity. For instance this could be the serving cell identity, or a sequence that is indicative of the serving cell identity. The first part is typically the same for all the UEs within the serving cell, i.e. it is cell specific. The first part is transmitted with the same periodicity as paging occasions or WUS listing intervals. Further it can be designed with signal/sequences with good correlation properties and can be detected non-coherently without any need to use the legacy synchronization signal such as CRS and/or PSS/SSS. The first part, when being received by a UE, can therefore be used for synchronization purposes, and with help from the cell identity indicator also to get an indication that it is still within cell coverage. Since the time/frequency drift can be assumed to scale with the length of inactivity between synchronization—i.e. the DRX periodicity/interval the amount of information needed for a re-synchronization is typically larger for a longer DRX periodicity. Therefore, the length of the first part may be configurable in relation to DRX length. An extra advantage of introducing first part is therefore that it helps not having a large time and frequency offset due to clock drift.

The second part of the WUS may only be transmitted by the BS if there is DL data queued for transmission to the UE. If the first part is designed such that it can also be used for synchronization purposes then second part can become somewhat shorter, but still can be detected non-coherently. It also implies that there is a case where the WUS with only first-part transmission, e.g. the second part does not need to be transmitted periodically. In this case, a given UE receives the first part and use it for serving cell measurement.

When the UE monitors the channel for WUS in some pre-determined occasion, it first check the cell identity indicator by decoding the first part determines and the signal strength of the serving cell. If the level of the signal is above a certain level determined by received signal strength and the cell identity indicator is correct, as well as possible some other signal performance criterions, then the UE continues to check for the existence of the second part. If the UE detects the second part carrying a certain information related to it, it then announces that a WUS is detected and continues to decode MPDCCH and PDSCH (whenever needed), for reception of paging signals and/or paging messages.

If the level of channel quality does not fulfill the serving cell signal strength criterion, or the cell identity indicator is not correct, the UE stops decoding the second part and enter the same procedure as legacy, i.e., the UE initiates the reception of possible legacy PSS/SSS signals and if needed performs measurements of all neighbor cells indicated by the serving cell, regardless of the measurement rules currently limiting UE measurement activities.

Summarizing, the following examples have been described:

EXAMPLE 1

A method of operating a terminal (102), comprising:
receiving a first part (711) of a wake-up signal (700) from a base station (101) and optionally receiving a second part (712) of the wake-up signal (700) from the base station (101), the first part (711) being related to a cell associated with the base station (101) and the second part (712) being related to the terminal (102).

EXAMPLE 2

The method of example 1, further comprising:
based on a synchronization signal (721) included in the first part (711) of the wake-up signal (700): synchronizing the terminal with the base station (101), and
based on said synchronizing: selectively receiving the second part (712) of the wake-up signal (700).

EXAMPLE 3

The method of examples 1 or 2, further comprising:
based on a reference signal (723) included in the first part (711) of the wake-up signal (700): performing channel sensing of a channel between the base station (101) and the terminal (102), and
depending on a result of said channel sensing: selectively receiving the second part (712) of the wake-up signal (700).

EXAMPLE 4

The method of example 2 or 3, further comprising:
depending on at least one of said synchronizing and the result of said channel sensing: selectively receiving at least one periodically broadcasted further reference signal (4102) not included in the wake-up signal (700).

EXAMPLE 5

The method of any one of the preceding examples, further comprising:
comparing a cell identity (722) of the cell associated with the base station (101) and included in the first part (711) with a reference cell identity, and depending on said comparing: selectively receiving the second part (712) of the wake-up signal (700).

EXAMPLE 6

The method of any one of the preceding examples, further comprising:
transitioning a receiver of the terminal (102) from an inactive state (384) to an active state (383),
wherein the first part (711) of the wake-up signal (700) is received in response to said transitioning.

EXAMPLE 7

The method of example 6, further comprising:
not synchronizing with the base station (101) between said transitioning of the receiver of the terminal (102) from the inactive state (384) to the active state (383) and until said receiving of the first part (711) of the wake-up signal (700).

EXAMPLE 8

A method of operating a base station (101) of a network (10), comprising:
transmitting a first part (711) of a wake-up signal (700) and optionally transmitting a second part (712) of the wake-up signal (700), the first part (711) being related to a cell associated with the base station (101) and the second part (712) being related to a terminal (102).

EXAMPLE 9

The method of example 8, further comprising:
checking if downlink data is queued for transmission to the terminal (102),
wherein the second part (712) of the wake-up signal (700) is selectively transmitted based on said checking.

EXAMPLE 10

The method of any one of the preceding examples,
wherein the first part (711) is configured as a preamble of the second part (712).

EXAMPLE 11

The method of any one of the preceding examples,
wherein the first part (711) of the wake-up signal (700) includes a synchronization signal (721) for time-frequency synchronization of the base station (101) and the terminal (102).

EXAMPLE 12

The method of any one of the preceding examples,
wherein the first part (711) of the wake-up signal (700) includes a reference signal (723) for channel sensing of a channel between the base station (101) and the terminal (102).

EXAMPLE 13

The method of any one of the preceding examples,
wherein the first part (711) of the wake-up signal (700) includes a cell identity (722) of a cell associated with the base station (101).

EXAMPLE 14

The method of any one of the preceding examples,
wherein the second part (712) of the wake-up signal (700) includes a terminal identity (731) of the terminal (102).

EXAMPLE 15

The method of any one of the preceding examples,
wherein the wake-up signal (700) is communicated time-aligned with a discontinuous reception cycle (370) of the terminal (102).

EXAMPLE 16

The method of example 15,
wherein a length of the first part (711) correlates with a periodicity (375) of the discontinuous reception cycle (370).

EXAMPLE 17

The method of any one of the preceding examples,
wherein a second sequence design configuration of the second part (712) of the wake-up signal (700) is less robust than a first sequence design configuration of the first part (711) of the wake-up signal (700).

EXAMPLE 18

A terminal (102) comprising control circuitry (1022) configured to perform:
receiving a first part (711) of a wake-up signal (700) from a base station (101) and optionally receiving a second part (712) of the wake-up signal (700) from the base station (101), the first part (711) being related to a cell associated with the base station (101) and the second part (712) being related to the terminal (102).

EXAMPLE 19

The terminal of example 18,
wherein the control circuitry (1022) is configured to perform the method of any one of examples 1-7 or 10-17.

EXAMPLE 20

A base station (101) of a network (100), the base station comprising control circuitry (1012) configured to perform:
transmitting a first part (711) of a wake-up signal (700) and optionally transmitting a second part (712) of the wake-up signal (700), the first part (711) being related to a cell associated with the base station (101) and the second part (712) being related to a terminal (102).

EXAMPLE 21

The base station (101) of example 20,
wherein the control circuitry (1012) is configured to perform the method of any one of examples 8-17.

Although the invention has been described with reference to certain examples and embodiments, the invention is not limited by such examples and embodiments. Rather, various modifications are covered by the invention as understood from the appended claims.

For illustration, various examples have been described in which separate signals are employed for channel sensing and synchronization at the UE. However, generally, it would be possible to implement a signal that could provide means for combinations of cell identification, synchronization, and channel sensing.

Further, for example the channel sensing may in general not need a separate signal, but could be done using synchronization signal and/or reference signal. The combination of both signals can improve the channel sensing measurement accuracy. The base-station may need to inform the UE on the relative power different between these two signals, if they are transmitted separately.

For further illustration, above various scenarios have been described in which various decision criteria for selectively receiving the second part of the WUS have been employed. Example decision criteria include: synchronization with the BS and channel sensing and cell identity. In the various examples described herein it is possible to flexibly combine such decision criteria with each other. For example, it would be possible to use the channel sensing as a decision criterion; but not use the synchronizing as a decision criterion.

The invention claimed is:

1. A method of operating a terminal, comprising:
   receiving a first part of a wake-up signal from a base station, the first part being related to a cell associated with the base station,
   based on a synchronization signal included in the first part of the wake-up signal: synchronizing the terminal with the base station, and
   based on said synchronizing: selectively receiving a second part of the wake-up signal from the base station, the second part being related to the terminal,
   wherein a cell identity of the cell is encoded into the synchronization signal.

2. The method of claim 1,
   wherein the first part of the wake-up signal consists of the synchronization signal.

3. The method of claim 1, further comprising:
   based on a reference signal included in the first part of the wake-up signal: performing channel sensing of a channel between the base station and the terminal, and
   depending on a result of said channel sensing: selectively receiving the second part of the wake-up signal.

4. The method of claim 3, further comprising:
   depending on at least one of said synchronizing and the result of said channel sensing: selectively receiving at least one periodically broadcasted further reference signal 2 not included in the wake-up signal.

5. The method of claim 1,
   wherein the first part consists of a reference signal,
   wherein the method further comprises:
   based on the reference signal: performing channel sensing of a channel between the base station and the terminal and synchronizing the terminal with the base station, and
   depending on a result of said channel sensing and based on said synchronizing: selectively receiving the second part of the wake-up signal.

6. The method of claim 1, further comprising:
   comparing a cell identity of the cell associated with the base station and included in the first part with a reference cell identity, and
   depending on said comparing: selectively receiving the second part of the wake-up signal.

7. The method of claim 1, further comprising:
   transitioning a receiver of the terminal from an inactive state to an active state,
   wherein the first part of the wake-up signal is received in response to said transitioning.

8. The method of claim 7, further comprising:
   not synchronizing with the base station between said transitioning of the receiver of the terminal from the inactive state to the active state and until said receiving of the first part of the wake-up signal.

9. A method of operating a base station of a network, comprising:
   transmitting a first part of a wake-up signal and transmitting a second part of the wake-up signal, the first part being related to a cell associated with the base station and the second part being related to a terminal
   wherein the first part of the wake-up signal includes a synchronization signal for synchronizing the terminal with the base station, and
   wherein a cell identity of the cell is encoded into the synchronization signal.

10. The method of claim 9, further comprising:
    checking when downlink data is queued for transmission to the terminal,
    wherein the second part of the wake-up signal is selectively transmitted based on said checking.

11. The method of claim 9,
    wherein the first part is configured as a preamble of the second part.

12. The method of claim 9,
    wherein the first part of the wake-up signal includes a reference signal for channel sensing of a channel between the base station and the terminal.

13. The method of claim 9,
    wherein a time gap is arranged in-between the first part of the wake-up signal and the second part of the wake-up signal.

14. A terminal comprising control circuitry configured to perform:
    receiving a first part of a wake-up signal from a base station, the first part being related to a cell associated with the base station;
    based on a synchronization signal included in the first part of the wake-up signal: synchronizing the terminal with the base station, and
    based on said synchronizing: selectively receiving a second part of the wake-up signal from the base station, the second part being related to the terminal;
    wherein a cell identity of the cell is encoded into the synchronization signal.

15. A base station of a network, the base station comprising control circuitry configured to perform:
    transmitting a first part of a wake-up signal and transmitting a second part of the wake-up signal, the first part being related to a cell associated with the base station and the second part being related to a terminal,
    wherein the first part of the wake-up signal includes a synchronization signal for synchronizing the terminal with the base station, and
    wherein a cell identity of the cell is encoded into the synchronization signal.

* * * * *